US011356564B2

(12) United States Patent
Antunes et al.

(10) Patent No.: US 11,356,564 B2
(45) Date of Patent: *Jun. 7, 2022

(54) MONITORING VOICE-OVER-IP PERFORMANCE OVER THE INTERNET

(71) Applicant: Cisco Technology, Inc., San Jose, CA (US)

(72) Inventors: Joao Antunes, San Francisco, CA (US); Ricardo V. Oliveira, San Francisco, CA (US)

(73) Assignee: Cisco Technology, Inc., San Jose, CA (US)

(*) Notice: Subject to any disclaimer, the term of this patent is extended or adjusted under 35 U.S.C. 154(b) by 30 days.

This patent is subject to a terminal disclaimer.

(21) Appl. No.: 17/037,379

(22) Filed: Sep. 29, 2020

(65) Prior Publication Data

US 2021/0136231 A1 May 6, 2021

Related U.S. Application Data

(63) Continuation of application No. 15/153,642, filed on May 12, 2016, now Pat. No. 10,834,265.

(60) Provisional application No. 62/180,009, filed on Jun. 15, 2015.

(51) Int. Cl.
*H04M 7/00* (2006.01)
*H04L 65/80* (2022.01)
*H04L 65/65* (2022.01)

(52) U.S. Cl.
CPC .......... *H04M 7/006* (2013.01); *H04L 65/608* (2013.01); *H04L 65/80* (2013.01)

(58) Field of Classification Search
CPC ....... H04M 7/006; H04L 65/608; H04L 65/80
See application file for complete search history.

(56) References Cited

U.S. PATENT DOCUMENTS

| | | | | |
|---|---|---|---|---|
| 8,418,000 B1* | 4/2013 | Salame | ................ | G06F 11/079 714/26 |
| 10,834,265 B1* | 11/2020 | Antunes | ................ | H04M 7/006 |
| 2002/0037735 A1* | 3/2002 | Maggenti | ............ | H04L 63/0428 455/517 |
| 2002/0167936 A1* | 11/2002 | Goodman | ........... | H04L 41/5003 370/352 |

(Continued)

OTHER PUBLICATIONS

Cole et al., Voice Over IP Performance Monitoring, ACM SIGCOMM Computer Communication Review, vol. 31, Issue 2, Apr. 2, 2001, pp. 9-24.

(Continued)

*Primary Examiner* — Christine Ng
(74) *Attorney, Agent, or Firm* — Behmke Innovation Group LLC; James M. Behmke; Jonathon P. Western

(57) ABSTRACT

Techniques for monitoring Voice-over-IP (VoIP) network services over the Internet are disclosed. In some embodiments, a system, process, and/or computer program product for monitoring and/or troubleshooting VoIP network services over the Internet includes performing VoIP call initiation testing using a source agent and a target agent; performing synthetic VoIP call quality testing using the source agent and the target agent over the Internet; and generating a report based on the VoIP call initiation testing and the synthetic VoIP call quality testing over the Internet.

20 Claims, 24 Drawing Sheets

(56) References Cited

U.S. PATENT DOCUMENTS

| | | | | |
|---|---|---|---|---|
| 2005/0124293 | A1* | 6/2005 | Alicherry | G01S 5/14 |
| | | | | 455/41.2 |
| 2006/0274760 | A1* | 12/2006 | Loher | H04M 3/2236 |
| | | | | 370/395.52 |
| 2007/0195707 | A1* | 8/2007 | Gidon | H04L 43/50 |
| | | | | 370/252 |
| 2008/0159168 | A1* | 7/2008 | Ariyoshi | H04L 43/12 |
| | | | | 370/253 |
| 2009/0013398 | A1* | 1/2009 | Cookmeyer, II | H04L 43/10 |
| | | | | 726/11 |
| 2010/0121974 | A1* | 5/2010 | Einarsson | H04L 47/10 |
| | | | | 709/231 |
| 2010/0259448 | A1* | 10/2010 | Qahwash | G01S 5/021 |
| | | | | 342/387 |
| 2010/0290344 | A1* | 11/2010 | Meloche | H04L 41/12 |
| | | | | 370/241 |
| 2011/0254961 | A1* | 10/2011 | Putnam | H04L 43/08 |
| | | | | 348/180 |
| 2011/0292797 | A1 | 12/2011 | Bejerano | |
| 2012/0042082 | A1* | 2/2012 | Liao | H04L 61/1505 |
| | | | | 709/227 |
| 2012/0163214 | A1 | 6/2012 | So | |
| 2013/0311547 | A1* | 11/2013 | Foti | H04L 51/20 |
| | | | | 709/203 |
| 2015/0131519 | A1 | 5/2015 | Kanabar | |
| 2016/0105346 | A1* | 4/2016 | Pignataro | H04L 63/065 |
| | | | | 370/253 |
| 2016/0119294 | A1* | 4/2016 | Petach | H04L 9/0891 |
| | | | | 713/150 |
| 2017/0041210 | A1 | 2/2017 | Kosbab | |

OTHER PUBLICATIONS

Demichelis et al., IP Packet Delay Variation Metric for IP Performance Metrics (IPPM), Network Working Group, Nov. 2002.

Schulzrinne et al., RTP: A Transport Protocol for Real-Time Applications, Network Working Group, Jul. 2003.

Author Unknown, Estimates of IE and BPL Parameters for a Range of CODEC Types, International Telecommunication Union, Telecommunication Standardization Sector, Jan. 2003.

Moller et al., Instrumental Estimation of E-Model Parameters for Wideband Speech Codecs, Hindawi Publishing Corporation, EURASIP Journal on Audio, Speech and Music Processing, 2010.

Spencer et al., IAX: Inter-Asterisk Exchange Version 2, Feb. 2010.

Rosenberg et al., SIP: Session Initiation Protocol, Network Working Group, Jun. 2002.

Author Unknown, Series G: Transmission Systems and Media, Digital Systems and Networks, International Telephone Connections and Circuits—Transmission Planning and the E-Model, The E-Model: A Computational Model for Use in Transmission Planning, International Telecommunications Union, ITU-T Telecommunication Standardization Sector of ITU, G.107, Feb. 2014.

Author Unknown, Series G: Transmission Systems and Media, Digital Systems and Networks, International Telephone Connections and Circuits—General Recommendations on the Transmission Quality for an Entire International Telephone Connection, International Telecommunications Union, ITU-T Telecommunication Standardization Sector of ITU, G.113, Amendment 1, Mar. 2009.

Author Unknown, Series H: Audiovisual and Multimedia Systems, Infrastructure of Audiovisual Services—Systems and Terminal Equiment for Audio Visual Services, Packet-Based Multimedia Communications Systems, International Telecommunication Union, ITU-T Telecommunication Standardization Sector of ITU, H.323, Dec. 2009.

Kushman et al., Can You Hear Me Now?!, It Must Be BGP, Computer Communication Review, 2007.

Nicolas Cote, Integral and Diagnostic Intrusive Prediction of Speech Quality, T-Labs Series in Telecommunication Services, 2011.

Alexander Raake, Speech Quality of VOIP, Assessment and Prediction, 2007.

* cited by examiner 193.126.240.13
A5P1A

MONITORING VOICE-OVER-IP PERFORMANCE OVER THE INTERNET

CROSS REFERENCE TO OTHER APPLICATIONS

This application is a continuation of U.S. patent application Ser. No. 15/153,642 entitled MONITORING VOICE-OVER-IP PERFORMANCE OVER THE INTERNET filed May 12, 2016, which claims priority to U.S. Provisional Patent Application No. 62/180,009 entitled TROUBLESHOOTING VOICE-OVER-IP NETWORK SERVICES USING NETWORK PATH TRACING filed Jun. 15, 2015, both of which are incorporated herein by reference for all purposes.

BACKGROUND OF THE INVENTION

Voice over Internet Protocol (VoIP) is a suite of protocols and technologies that allow two or more parties to communicate with each other using voice and audio over a packet-switched network. VoIP is an increasingly popular technology solution for enterprises and consumers.

BRIEF DESCRIPTION OF THE DRAWINGS

Various embodiments of the invention are disclosed in the following detailed description and the accompanying drawings.

DETAILED DESCRIPTION

Figure 1:
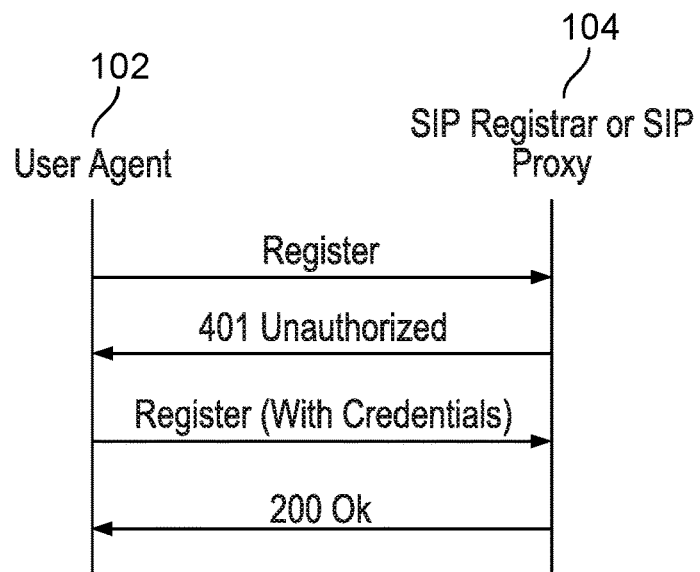
FIG. 1 illustrates an example of a Session Initiation Protocol (SIP) registration.

The invention can be implemented in numerous ways, including as a process; an apparatus; a system; a composition of matter; a computer program product embodied on a non-transitory tangible computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Voice over Internet Protocol (VoIP) is a suite of protocols and technologies that allow two or more parties to communicate with each other using voice and audio over a packet-switched network. VoIP is an increasingly popular technology solution for enterprises and consumers.

Existing approaches that can be used for reporting on VoIP network services are generally passive approaches (e.g., monitoring actual user calls over VoIP services using non-active/passive approaches), such as traffic capture-based approaches, Simple Network Management Protocol (SNMP)-based approaches, and approaches that utilize Application Programming Interfaces (APIs) to obtain Call Data Records (CDRs) (e.g., using Microsoft's Skype for Business/Lync APIs or other APIs).

However, non-active/passive approaches for reporting on VoIP network services are inadequate for several reasons. For example, such non-active/passive approaches generally cannot provide insights into network performance and/or problems in a network path between the two endpoints (e.g., such non-active/passive approaches only provide a snapshot of the two endpoints and fail to provide network performance/status information on intermediate network nodes/hops in between the two endpoints).

Thus, what are needed are improved techniques for monitoring VoIP network services over the Internet.

Overview of Techniques for Monitoring VoIP Network Services Over the Internet

Accordingly, new and improved techniques for monitoring VoIP network services over the Internet are disclosed. VoIP network services are also referred to herein as VoIP services or simply VoIP.

For example, various active probing/testing techniques for monitoring and/or troubleshooting VoIP network services (e.g., to monitor VoIP call setup and/or to monitor VoIP call/video quality) over the Internet are disclosed. Example techniques are described below that can be performed during a planning/predeployment phase and/or during an operation phase/deployed VoIP network services.

In an example implementation, agents (e.g., enterprise agents for monitoring VoIP network services over the Internet, such as further described below) can be deployed on enterprise/cloud service provider networks (e.g., the agents can be deployed on client and/or server devices (in different locations/geographies) on enterprise networks and in VoIP cloud service provider networks as well as deployed on devices in various locations/geographies by a service provider that provides VoIP network services monitoring using the disclosed techniques) (e.g., the deployed agents can be scheduled to execute periodically, such as every five minutes or some other time interval and/or on demand, to identify VoIP issues/problems for a given enterprise/cloud service provider, etc.). For example, reports and/or alerts can be generated (e.g., to network admins) when the deployed agents detect a VoIP quality problem(s). As another example, the deployed agents can be utilized to perform various active probing/testing to troubleshoot VoIP performance problems for an enterprise's users of the VoIP network services.

In one embodiment, a system, process, and/or computer program product for monitoring and/or troubleshooting VoIP network services over the Internet includes using network path tracing and a Session Initiation Protocol (SIP) between one or more SIP agents and a SIP registrar (e.g., for performing SIP active probing/testing techniques). For example, the SIP agents can connect to a SIP Server and register their respective SIP Endpoints in the same way as would a typical SIP user agent (e.g., both endpoints are instrumented (executing agents configured/instrumented for performing the disclosed active probing/testing techniques)).

As an example use case scenario, the disclosed active probing/testing techniques (e.g., SIP and/or RTP implemented active probing/testing techniques) can be applied to identify predeployment problems for VoIP network services over the Internet and/or to facilitate identification of deployment configurations that would facilitate improved performance of VoIP network services (e.g., testing whether a network between two branch offices of an enterprise has sufficient bandwidth to support VoIP network services such as based on the disclosed RTP testing for voice call quality techniques and/or the disclosed capacity testing techniques, identifying viable and/or optimal audio encoders and decoders (codecs) for the deployment of VoIP network services over the Internet and/or other configuration parameters/options, and/or testing other aspects of VoIP network services over the Internet). As used herein, an endpoint generally refers to the TCP/IP address (e.g., IPv4 or IPv6 network address, transport protocol, and port number) in which the entity will be receiving network packets. As further described below, the SIP registration process is generally composed of several operations/stages, such as from DNS resolution to sending SIP commands with the correct credentials over the network.

In one embodiment, a system, process, and/or computer program product for monitoring and/or troubleshooting VoIP network services over the Internet includes using network path tracing and a generated synthetic voice stream (e.g., computer generated synthetic voice stream for an automatically generated synthetic call, which is also referred to herein as a synthetic voice call or a synthetic VoIP call) between two endpoints (e.g., Real-time Transport Protocol (RTP) endpoints) and computing a quality of the VoIP call (e.g., RTP active testing techniques, in which both endpoints are instrumented (executing agents configured/instrumented for performing the disclosed active testing techniques)). For example, the quality of the VoIP call (e.g., synthetic voice call) can be computed based on the well-known metric Mean Opinion Score (MOS). In this example, the MOS metric can be used as an overall indicator of the quality of the VoIP call as will be further described below. In another example, the disclosed techniques for monitoring and/or troubleshooting VoIP network services over the Internet include monitoring and/or troubleshooting synthetic video calls over the Internet using another RTP stream as also further described below.

In one embodiment, a system, process, and/or computer program product for monitoring and/or troubleshooting VoIP network services over the Internet includes using network path tracing and a generated synthetic voice stream (e.g., automatically generated synthetic (voice) calls), including a VoIP call session setup and generation of the synthetic voice stream for testing the VoIP call session setup and synthetic VoIP call quality, such as further described below.

In one embodiment, a system, process, and/or computer program product for monitoring and/or troubleshooting VoIP network services over the Internet includes performing both SIP and RTP active testing techniques as further described below. For example, the disclosed SIP and RTP active probing/testing techniques (e.g., in which both endpoints are instrumented (executing agents configured/instrumented for performing the disclosed active testing techniques)) can be implemented to facilitate a complete/full test that provides a more realistic VoIP emulation test and can identify problems that would not be detected with stand-alone RTP and SIP tests (e.g., such as if a SIP Server configuration has an incorrect/slower network interface for an endpoint B, the network path changes when going through the SIP Server such that different network delays/drops problems can arise, and/or other problems, such as further described below).

In one embodiment, a system, process, and/or computer program product for monitoring and/or troubleshooting VoIP network services over the Internet includes performing bi-directional tests (e.g., SIP and/or RTP active testing can be performed from endpoint A to endpoint B and such testing can also be performed from endpoint B to endpoint A). For example, different VoIP call establishment or quality degradation problems can be detected from different directions of VoIP call initiations (e.g., based on bi-directional active testing techniques) as further described below.

In one embodiment, the disclosed techniques for monitoring and/or troubleshooting VoIP network services over the Internet are applied to VoIP services without instrumentation of the server (e.g., SIP Server). For example, the disclosed techniques for monitoring and/or troubleshooting VoIP network services over the Internet can be applied to a cloud-based VoIP service (e.g., using a cloud-based agent(s)) and/or an enterprise-based VoIP service in which the SIP Server is not instrumented with a server agent, such as will be described below.

In one embodiment, network path tracing is performed to collect information from individual layer-3 hops, such as including loss, delay, and Differentiated Services Code Point (DSCP) packet mangling (e.g., these techniques can be performed for each of the embodiments described above). For example, the data from multiple agents for each time interval can be merged to provide a more accurate representation of the state of the network, which facilitates inferring a root cause of VoIP call establishment or quality degradation using the various techniques described further below. As another example, network path tracing and Border Gateway Protocol (BGP) monitoring can be performed for monitoring and/or troubleshooting VoIP network services over the Internet (e.g., DSCP enhancements can be utilized for path tracing to detect if an intermediate network hop is modifying the DSCP configured value, such as downgrading the quality of the routing for the packets).

These and other techniques for monitoring and/or troubleshooting VoIP network services over the Internet will be further described below.

Overview of VoIP Network Services Over the Internet

Typically, VoIP calls are divided into three phases: (1) registration, (2) session setup, and (3) voice data transfer. Session Initiation Protocol (SIP) is an Internet Engineering Task Force (IETF) standard protocol used to register users, and create, modify, and terminate sessions between the participants. To deliver voice and audio information, the IETF defined the Real-time Transport Protocol (RTP), which specifies the packetization and correct playback of audio frames. Audio encoders and decoders (codecs) are used to convert analog audio signals to and from a digital format. As further described below, the various techniques for monitoring VoIP network services over the Internet described herein generally focus on embodiments that implement SIP for signaling and session control and RTP for media transport, as SIP and RTP are the most popular VoIP protocols in use today. Also, the various techniques for monitoring VoIP network services over the Internet described herein can be adapted to a different set of VoIP protocols, such as ITU approved standard H.323 protocol (e.g., see ITU-T Recommendation H.323 (12/09) available at https://www.itu.int/rec/T-REC-H.323-200912-I/en), IETF RFC 5456 Inter-Asterisk eXchange (IAX) (e.g., see IETF RFC 5456 for IAX Version 2 protocol available at https://tools.ietf.org/html/rfc5456), Cisco's proprietary Skinny Client Control Protocol (SCCP) (e.g., SCCP is a proprietary network terminal control protocol originally developed by Selsius Systems, which was acquired by Cisco Systems in 1998), and/or other proprietary or standard VoIP protocols.

A user SIP entity is referred to as a User Agent (UA), and the UA implements two different components: (1) a User Agent Client (UAC), which sends SIP requests and receives its responses; and (2) a User Agent Server (UAS), which handles the SIP requests. For example, a UA initiating the voice call carries out the role of the UAC, whereas the destination of the call is handled by the UAS.

Typically, establishing a voice call between a UAC and a UAS is mediated by one or more SIP Servers. The SIP Servers receive and process SIP requests and forward them to other SIP Servers or the UAS. There are three types or roles of SIP Servers: (1) SIP Registrar server, (2) SIP Proxy server, and (3) SIP Redirect server. A SIP Registrar server provides a current location of every registered SIP user. A SIP Proxy server forwards SIP requests to a SIP Server that will handle the SIP requests (e.g., while providing authentication or monitoring). And finally, a SIP Redirect server generates a SIP response to a sender of a SIP request with the location of a next SIP Server. When there is no need to identify a specific role of the SIP Server, then it is simply referred to herein as a SIP Server.

FIG. 1 illustrates an example of a Session Initiation Protocol (SIP) registration. Generally, a first step before establishing a VoIP call between two participants includes having each of the two participants register their current location with a SIP Registrar through SIP REGISTER messages. This typically happens periodically so that the SIP Registrar has an updated list of registered users and their latest known SIP Endpoints. Referring to FIG. 1, a SIP REGISTER message is sent from a UA 102 to a SIP Registrar or SIP Proxy 104. SIP Registrar or SIP Proxy 104 responds with a 401 unauthorized message in this example as the SIP REGISTER message did not include proper/authorized UA credentials. As also shown, a SIP REGISTER message (with authorized/correct credentials) is sent from a UA 102 to a SIP Registrar or SIP Proxy 104. SIP Registrar or SIP Proxy 104 responds with a 200 OK message in this example as the previously sent SIP REGISTER message included the authorized/correct UA credentials.

Figure 2:
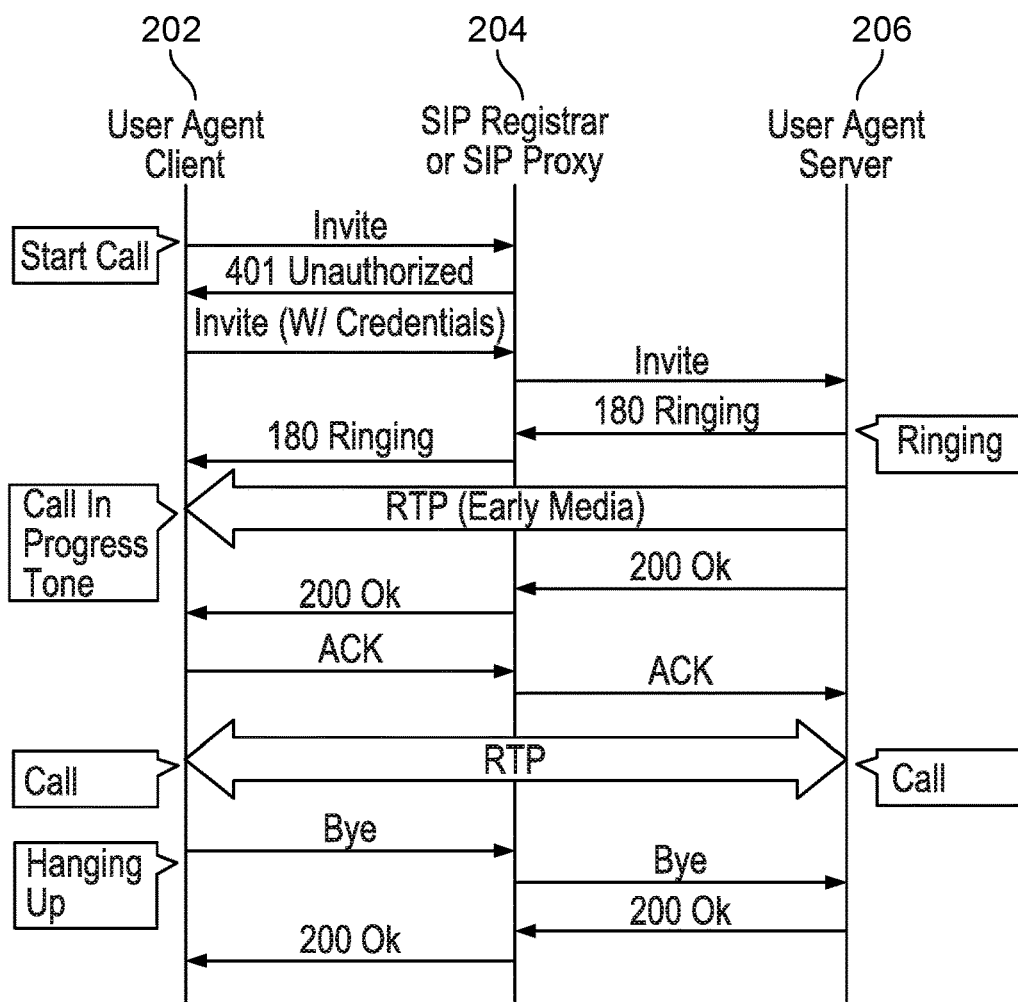
FIG. 2 illustrates an example of a SIP session setup with a single SIP Server.

FIG. 2 illustrates an example of a SIP session setup with a single SIP Server. Generally, a SIP session setup is initiated by a UAC (e.g., UA Client 202 as shown in FIG. 2) by sending a SIP INVITE message to its SIP Registrar or SIP Proxy (e.g., SIP Registrar/Proxy 204 as shown in FIG. 2). The SIP INVITE message contains its local RTP endpoint and the SIP Uniform Resource Indicator (URI) of the UAS. The actual SIP infrastructure could be more complex involving SIP redirection or the SIP Proxy contacting the actual SIP Registrar. For example, each UA can be registered at different SIP Registrars, which generally requires the SIP Servers to forward the SIP requests and responses between them until they reach the respective UAS. For the purpose of presenting the disclosed techniques for monitoring VoIP network services over the Internet, the number of SIP Servers and the interaction among them is not of relevant significance, and they can be depicted as one abstract SIP Server entity (e.g., UA Server 206 as shown in FIG. 2).

Referring to FIG. 2, if authentication is required, a SIP Registrar/Proxy server (e.g., shown as SIP Registrar/Proxy 204) replies to an initial SIP INVITE (without authorized/correct credentials) with a SIP 4xx message (e.g., a 401 unauthorized message as shown in FIG. 2). Once the UAC sends another SIP INVITE with the authorized/correct credentials (e.g., an INVITE message as shown in FIG. 2), the SIP Registrar/Proxy server forwards the SIP INVITE to the UAS (e.g., shown as UA Server 206 in FIG. 2) or to the SIP Registrar where the UAS is registered.

After the UAS receives the SIP INVITE, it typically notifies the user that a call is being established through a notification, such as via an audible sound (e.g., a ringtone). In addition, the UAS replies to the SIP Registrar/Proxy server with a SIP 180 (Ringing) message that is forwarded to the UAC. The UAC's phone device can then, for example, emit a call in progress tone for notifying the user that the callee's phone is ringing.

In some cases, if early media is supported, then the UAS can open an RTP stream to the UAC and start transmitting audio immediately (e.g., a custom ringtone or music while a call is in progress, such as shown in FIG. 2). Once the callee answers the call, the UAS sends a SIP 200 (OK) message containing its own RTP endpoint.

At this point, the voice/VoIP call is established and both parties (e.g., UAC and UAS) know each other's RTP endpoints, sent in the SIP INVITE and SIP 200 (OK) messages as described above, and can therefore exchange audio through RTP streams (e.g., typically, a voice call between two UAs uses two RTP streams, one for each audio source). Voice and audio are encoded at the source using a specific codec (e.g., a G.711 compliant codec, in which G.711 is an ITU-T standard for audio that is often used in VoIP telephony, which specifies a narrowband audio codec, or another codec can be utilized based on a codec negotiation between the UAC and UAS), and the same codec is used at the destination to decode the packets into voice samples and play it back to the receiver. The codec negotiation is well known to one of ordinary skill in the art of VoIP telephony and is not further described. However, in some cases where the UAs (e.g., UAC and UAS) cannot agree on a common supported codec, transcoding can be performed by a SIP Proxy. For example, this can happen when the SIP Proxy replaces the RTP endpoints of the SIP messages with its own address and establishes an RTP stream to the UAC and another to the UAS, each one with their respective codec.

Generally, an RTP stream is a sequence of RTP packets, over the well-known User Datagram Protocol (UDP), containing one or more audio frames, and generated at a regular rate, as dictated by the codec. At the receiver side, voice packets are stored in a queue to be played back, which is generally referred to as the de jitter buffer. The de-jitter buffer generally stores packets and delays their playback for a specified maximum amount of time to reduce the effect of packet delay variations. For example, a very small de jitter buffer size may cause a large number of packets to be discarded, whereas a higher buffer size will incur additional voice latency. As a general rule, a static de-jitter buffer should be about the same size of the Packet Delay Variation (PDV) time to avoid frame discards while minimizing the impact on the voice quality for VoIP calls.

SIP Server Testing

A VoIP call can also be established directly between the UAC and the UAS, bypassing the SIP infrastructure. However, this is typically not feasible within public or corporate/enterprise networks, because each UA would need to maintain an updated list with the location of every UA it may wish to establish a voice call with. SIP Registrar servers provide a central registration and location service. As a result, SIP Servers are generally a crucial entity to the SIP infrastructure.

In one embodiment, an agent (e.g., functioning as a UAC) tests a SIP Server by sending SIP messages to the SIP Server endpoint (e.g., either a SIP Registrar or a SIP Proxy that will forward the SIP requests to the appropriate SIP Registrar). In addition, a path trace can be performed from the agent to the SIP Server endpoint (e.g., during the same, subset, or overlapping time interval). In an example implementation, the disclosed SIP Server testing techniques can be performed without instrumenting the SIP Server (e.g., an agent is not deployed and executed on the SIP Server in this example implementation).

According to IETF RFC 3261 (e.g., see Section 11—Querying for Capabilities of IETF RFC 3261, which is available at https://www.ietforg/rfc/rfc3261.txt), the SIP OPTIONS command can be used to determine if a SIP Server is unreachable if there is no response after a timeout. In addition, the SIP OPTIONS command does not usually require an established SIP dialog or SIP authentication.

As such, the SIP OPTIONS command can be used in the disclosed active tests for SIP testing, such as for measuring loss, latency, and jitter between the agent (e.g., acting as a UAC) and the SIP Server endpoint. In one embodiment, loss, latency, and jitter are calculated by sending a series of SIP OPTIONS requests from the agent (e.g., acting as a UAC) to the SIP Server endpoint and capturing the respective responses as further described below. For example, SIP responses can be matched to the requests by checking specific SIP fields, such as Call-ID, CSeq, and To and From tags.

Figure 3:
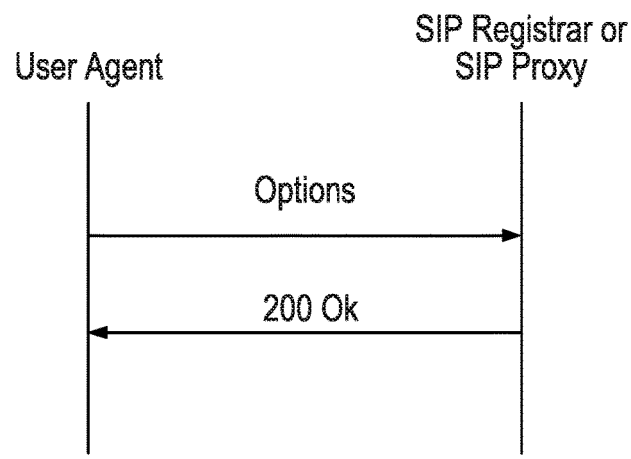
FIG. 3 illustrates an example of a typical SIP OPTIONS message sequence.

FIG. 3 illustrates an example of a typical SIP OPTIONS message sequence. If no SIP response is received within a timeout, the respective request or response is considered lost.

Test Configuration for SIP Server Testing

An example test configuration for SIP testing (e.g., using active testing techniques) will now be described. For example, the input parameters of the test (e.g., application test for VoIP network services) can include the following parameters. For a target SIP Endpoint, the input parameters of the test can include the following parameters: a hostname or an IP address, a protocol, and a port of a SIP Registrar or a SIP Proxy (e.g., default 5060 for non-TLS and 5061 for TLS). For a SIP Registrar URI, the input parameters of the test can include the following parameter: SIP URI that contains the hostname of the SIP Registrar. For a frequency of the active testing, the input parameters of the test can include the following parameter: a time interval between test execution from each agent (e.g., test repeats every five minutes or some other time interval and/or on demand). In this example, network path tracing can be performed using the same packets as the application test.

Metrics Computation for SIP Testing

In this example test, the test determines if the UAs are able to contact the SIP Server (e.g., SIP Registrar or SIP Proxy) and if there are any network impairments affecting the path to that SIP Registrar.

Loss, Latency, and Jitter Measurements

Active testing for measuring loss, latency, and jitter for VoIP network services over the Internet will now be described. In an example implementation, to obtain a reliable estimation, a significant number of SIP requests can be sent to the SIP Server during a small window of time (e.g., a relatively small time interval). In this example test, the agent can generate 50 SIP OPTIONS requests (e.g., sent from the user agent to the SIP Registrar or SIP Proxy) to be sent at a 100-millisecond (ms) interval (e.g., or a different number of requests or a different time interval can be used for this example test).

In this example test, the SIP responses to the SIP OPTIONS requests can be matched to the SIP requests by checking the Call-Id, CSeq (e.g., which is incremented at every SIP request), and the To and From tags. Loss can then be calculated by identifying missing responses, such as for responses that have not been received after a timeout (e.g., one second or some other timeout interval).

Below is an example calculation of a loss measurement in this example SIP test.

Loss=#SIP Requests/#SIP Responses

In this example test, latency of each pair of matched SIP requests and responses can be calculated by subtracting from the timestamp at the time of reception, the timestamp at the time of transmission. This calculation for each matched pair yields a round-trip time (rtt). Assuming that the path is symmetrical (e.g., or the time difference between a packet traversing it in either direction is negligible), the latency can be estimated as half the round-trip time.

Below is an example calculation of a latency measurement in this example SIP test.

$$rtt_i = (t\_rx_i - t\_tx_i)/2$$

The agent can also be configured/instrumented to calculate other statistical metrics (e.g., other measurements) using the several pairs of matched SIP requests and responses. Examples of other statistical metrics can include mean, standard deviation, and jitter.

For example, the agent can be configured/instrumented to calculate the jitter as the average difference between all the estimated latencies as will now be described. Let $D(i, \bar{x})$ be the absolute difference between RTT i and j, and $\bar{x}$ as the average RTT (e.g., the average round-trip time).

Below is an example calculation of a jitter measurement in this example SIP test.

$$jitter = \sum_{i}^{n} D(i, \bar{x}) / (n-1)n$$

Network Path Tracing

In one embodiment, at the same time the SIP test is being performed (e.g., during a same time interval as the SIP testing is being executed), a network path trace can be performed to provide visibility into the network path being used by the application (e.g., between the agent (UAC) and the SIP Server for the VoIP application). The disclosed techniques for performing such network path tracing are described further below in a Techniques for Performing Network Path Tracing section.

Voice Call Quality Testing Using a Synthetic VoIP Stream

The quality of a VoIP call can generally depend on multiple factors including, for example, the microphone/speaker system, codec quality, network conditions, and/or de jitter buffer size. In one embodiment, the disclosed techniques for monitoring VoIP network services include using agents for active-based testing for monitoring network conditions, such as measuring loss, delay, and jitter as described above. In one embodiment, the disclosed techniques for monitoring VoIP network services include using agents for active probing/testing for monitoring network conditions, such as measuring the network conditions by generating a one-way synthetic VoIP stream between two agents for synthetic voice call quality testing (e.g., using an RTP data stream between the caller or source agent and the recipient of the call or target agent) as further described below with respect to FIG. 4.

Figure 4:
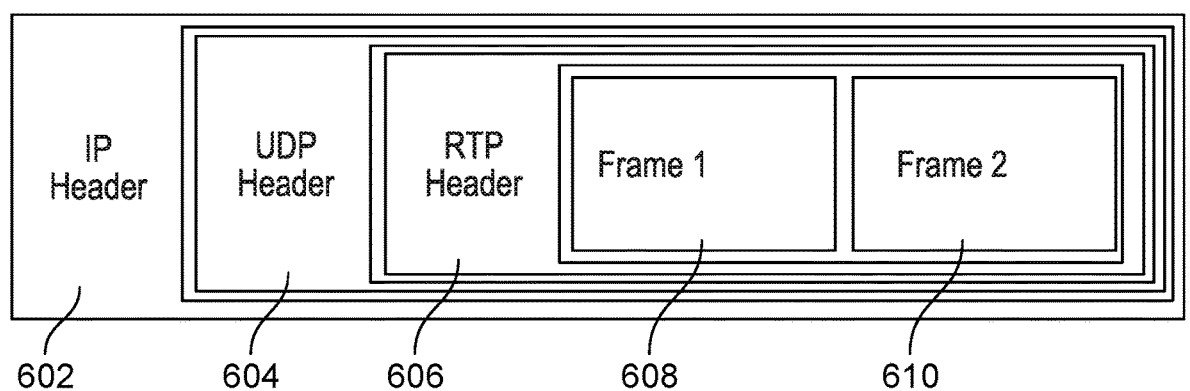
FIG. 4 illustrates an example Real-time Transport Protocol (RTP) packet with a custom payload shown as two audio frames encapsulated in a User Datagram Protocol (UDP) datagram in accordance with some embodiments.

FIG. 4 illustrates an example Real-time Transport Protocol (RTP) packet with a custom payload shown as two audio frames encapsulated in a User Datagram Protocol (UDP) datagram in accordance with some embodiments. Referring to FIG. 4, a stream includes a set of UDP packets with an IP header 602, a UDP header 604, an RTP header 606, and a custom payload shown as a Frame 1 at 608 and a Frame 2 at 610, which from the point of view of the network is indistinguishable from a real VoIP call (e.g., the disclosed synthesized RTP data stream with the custom payload generated by the disclosed agents would not be distinguishable from an RTP data stream for an actual VoIP call transmitted over the network). At the destination side, the sequence of RTP packets (e.g., synthesized RTP data stream) received by the agent are executed at the destination device (e.g., the target agent), and the target agent can compute loss, delay, and jitter as similarly described herein. These computed loss, delay, and jitter metrics can also be used to compute the Mean Opinion Score MOS-CQE (e.g., a measure of Conversational Quality based on the standard E-model, see http://www.itu.int/rec/T-REC-G.107/en). In this example, the MOS is computed as a numeric value from 1 to 5, in which 1 indicates a "bad" conversational quality and 5 indicates a "perfect" conversational quality.

Estimating a Clock Offset Between Endpoint Agents

Figure 5:
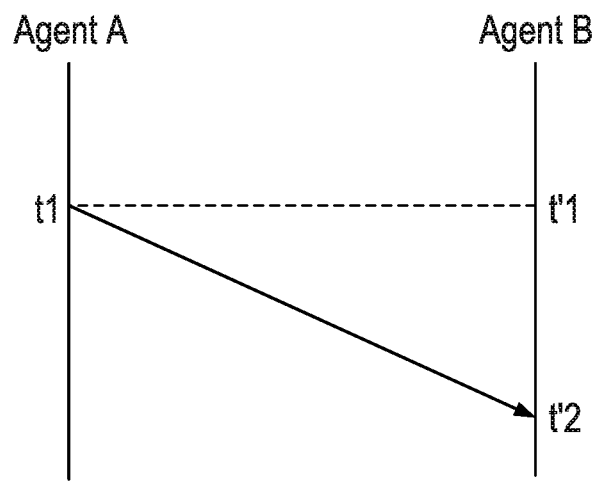
FIG. 5 illustrates a diagram for calculating one-way metrics between two endpoint agents given that their clocks are synchronized in accordance with some embodiments.

FIG. 5 illustrates a diagram for calculating one-way metrics between two endpoint agents given that their clocks are synchronized in accordance with some embodiments. One-way delay measurements, as opposed to round-trip measurements, use two different sources of information: the source's clock and the destination's clock (e.g., $t_n$ and $t'_n$ as shown in FIG. 5). The correct measurement for such one-way delay measurements generally includes ensuring the sources of information to be directly comparable, that is, to ensure that the clocks are in sync or to be able convert a timestamp taken by one clock into the other clock.

For example, to calculate the One-Way Delay (OWD) between two endpoint agents, shown as Agent A to Agent B in FIG. 5, given that their clocks synchronized (i.e., $t_n = t'_n$), the following calculation can be used as shown below.

$$\delta = t'2 - t'1, \text{ with } t1 = t'1$$

However, even if the two endpoints execute a clock synchronization protocol, such as Network Time Protocol (NTP), there can be small deviations between the clocks of the two endpoints (e.g., on the order of milliseconds (ms)), which may be reasonable for general clock synchronization purposes, but is not for estimating network latencies in relatively fast links.

Figure 6:
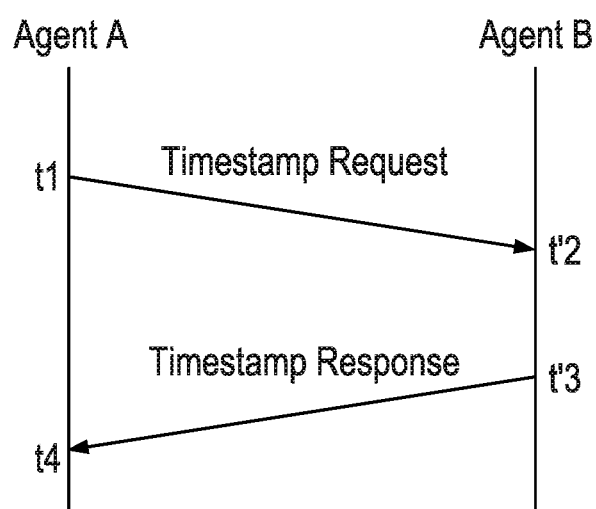
FIG. 6 illustrates a diagram for estimating a clock offset between endpoint agents using timestamps from two clock sources that are not synchronized in accordance with some embodiments.

FIG. 6 illustrates a diagram for estimating a clock offset between endpoint agents using timestamps from two clock sources that are not synchronized in accordance with some embodiments. In one embodiment, a clock offset calculation is determined to obtain accurate one-way metrics as will now be described. For example, to calculate the OWD between two endpoint agents (e.g., shown as Agent A and Agent B in FIG. 6) given that their clock offset is equal to $\Delta$, the following calculation can be used as shown below.

$$t'1=t1+\Delta$$

$$\delta=t'2-t'1 <=> \delta=t'2-(t1+\Delta)$$

In one embodiment, the clock offset between two endpoint agents, shown as Agent A to Agent B, is estimated as shown in FIG. 6. To compute the clock offset A between Agent A to Agent B, Agent A sends a UDP packet to Agent B (e.g., a Timestamp Request as shown in FIG. 6). In response, Agent B sends a UDP packet to Agent A (e.g., Timestamp Response as shown in FIG. 6) for each Timestamp Request packet it receives from Agent A. In one embodiment, RTP protocol messages are used with a custom payload, instead of audio frames to allow Agent A and Agent B to exchange their local timestamps (e.g., as further described below in the Custom RTP Header and Payload section). After receiving a Timestamp Request, the Target Agent B replies with local timestamps t'2 and t'3 as shown in FIG. 6. Agent A receives the Timestamp Response at timestamp t4 and matches the response to the request that Agent A sent at t1. It should be noted that t'2 and t'3 are timestamps provided by a different clock than t1 and t4.

Based on these four timestamps shown in FIG. 6, the following calculations can be performed as shown below.

$$t'2=t1+\delta1+\Delta$$

$$t4=t'3+\delta2-\Delta$$

where $\delta1$ is the OWD from Agent A to Agent B (A to B) and $\delta2$ is the OWD from Agent B to Agent A, and $\Delta$ is the clock offset at the time of the measurement.

Assuming that $\delta1 \sim \delta2$ (e.g., the routes from Agent A to Agent B and from Agent B to Agent A are symmetric or have similar latencies), then the following can be determined:

$$\Delta=(t'2+t'3)/2-(t1+t4)/2$$

In an example implementation, in order to minimize the impact of traffic in the clock offset calculation, several pairs of Timestamp Request and Timestamp Response packets can be used. The clock offset can then be calculated from the pair with lowest round-trip time (RTT), as shown below.

$$RTT=t4-t1-(t'3-t'2)$$

Once the offset $\Delta$ between both agents is estimated, Agent A can convert its local timestamps ($t_1$) to B's clock ($t'_1$) as shown below.

$$t'_1=t_1+\Delta$$

A stream of RTP packets can then be sent from A to B, containing A's local timestamps ($t_1$) adjusted to B's clock ($t'_1$), so B can compute the OWD for each packet from A to B as shown below.

$$\delta=t'2-t'1, \text{ with } t'_1=t_1+\Delta$$

Custom RTP Header and Payload

As described above, an agent can be configured/instrumented to calculate a clock offset using the local timestamps received from the other agent (e.g., as described above in the Estimating a Clock Offset Between Endpoint Agents section). In one embodiment, the RTP header and part of its payload can be used (e.g., as actual RTP audio frames are not being sent) to assist in the clock offset calculation as disclosed herein.

Figure 7A:
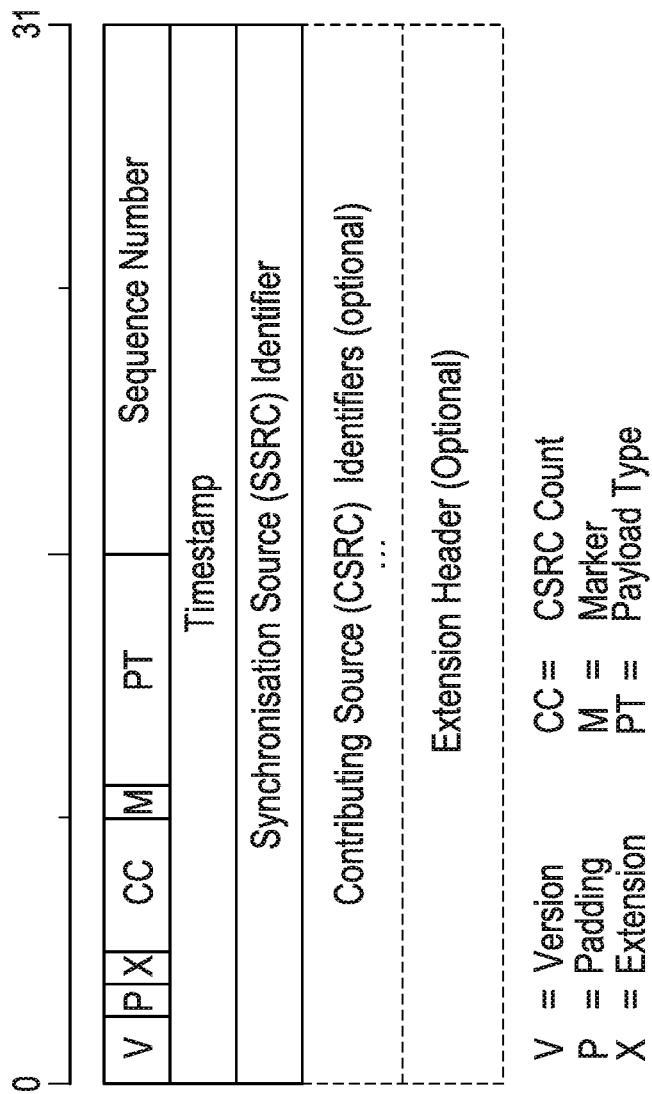
FIG. 7A illustrates a standard RTP header definition.

In one embodiment, the disclosed clock offset calculation protocol attempts to minimize changes to the standard RTP header so that the network handles those packets as it would handle actual voice packets. FIG. 7A illustrates a standard RTP header definition. For example, FIG. 7A illustrates a standard RTP header as expected by VoIP applications and routers (e.g., see IETF RFC 3550, available at https://www.ietf.org/rfc/rfc3550.txt).

Figure 7B:
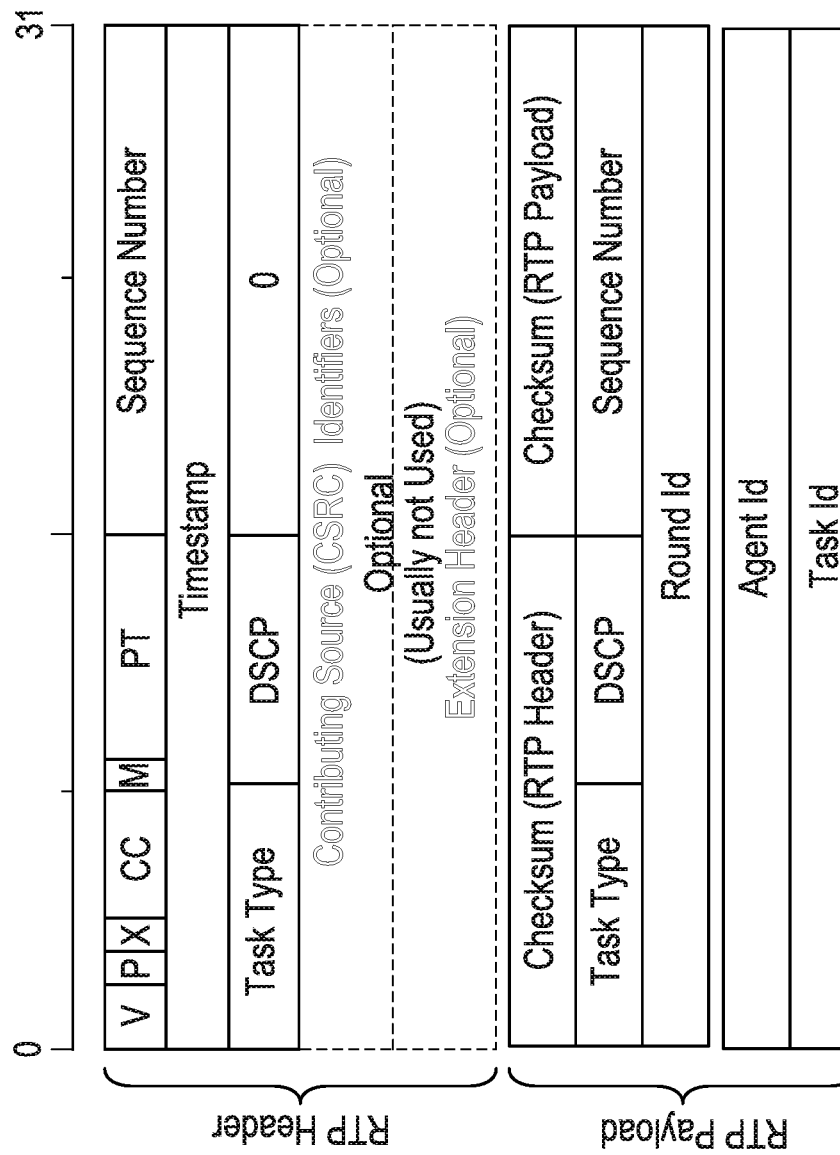
FIG. 7B illustrates a message specification of a Timestamp Request packet in accordance with some embodiments.

FIG. 7B illustrates a message specification of a Timestamp Request packet in accordance with some embodiments. The disclosed custom RTP header attempts to preserve most of the RTP fields. As shown in FIG. 7B, certain fields are re-used for the same purpose, such as the Sequence number or the 32-bit Timestamp, while other fields are converted to custom fields, such as the SSRC which is used to hold Task Type and DSCP. In addition, the first 20 bytes of the RTP payload are used to hold the remainder of the custom header. Specifically, FIG. 7B shows the specification of the Timestamp Request on top of the RTP header and the first 20 bytes of the RTP payload in accordance with some embodiments.

In one embodiment, the disclosed clock offset calculation protocol is performed as will now be described. The sender (e.g., Agent A) creates a Timestamp Request message with the above-described format. The Task Type field is an 8-bit field with the value 0x1. Besides the 5-tuple (e.g., source/destination IP addresses, protocol, and source/destination ports), the Sequence Number and Round Id are used to match each Timestamp Request with the respective response, with the Round Id being used to indicate the local time of the first request in seconds.

The 32-bit field Timestamp is encoded as in the RTP standard (e.g., IETF RFC 3550 referenced above), that is, the number of voice samples since a fixed starting point in time. In an example implementation, in order for the agents to convert a relative RTP timestamp to and from an absolute timestamp, the agents can be configured/instrumented to share the Round Id and use it as a common start fixed time in seconds. The agents are then able to convert the standard 32-bit RTP timestamp into a 64-bit timestamp (in milliseconds (ms)).

Figure 7C:
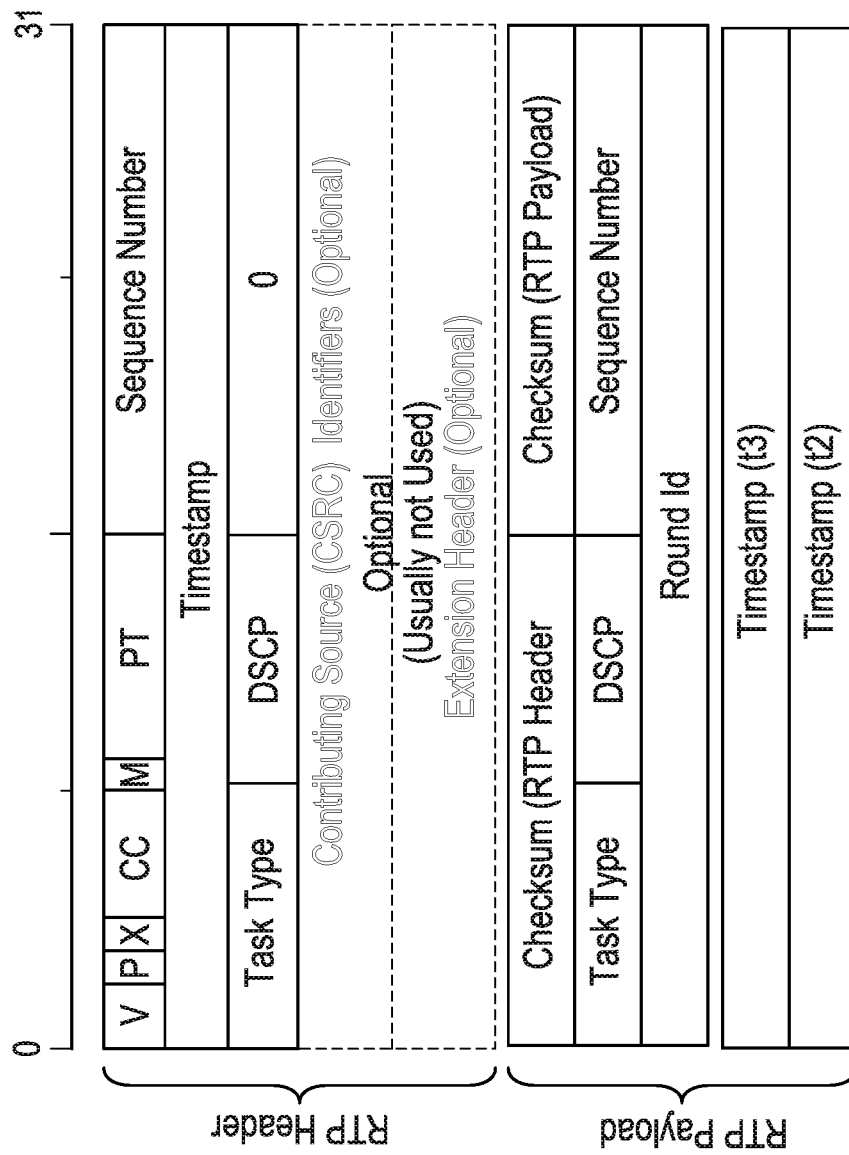
FIG. 7C illustrates a message specification of a Timestamp Response packet in accordance with some embodiments.

FIG. 7C illustrates a message specification of a Timestamp Response packet in accordance with some embodiments. In this example, the destination (e.g., receiving agent, Agent B) responds to the request (e.g., from Agent A) with a Timestamp Response packet with Task Type with value 0x2. In addition, the receiving agent (e.g., Agent B) copies the local timestamps of when the request was received (t2) and the current time before sending the response (t3). Each one of these timestamp fields is encoded in the RTP timestamp format, using the Round Id as the fixed starting time as described above. Timestamp (t3) is copied to the RTP header field to support RTP header rewrite by some SIP Proxies (e.g., as will be further described below). As such, FIG. 7C shows the format of the Timestamp Response in the above-described example.

Support for Packet Modification

In one embodiment, additional fields are utilized in the message specifications of Timestamp Request and Timestamp Response which, although not required in the clock offset calculation, serve another useful purpose, such as the eventual modification of the RTP packets by the network. These additional fields will now be described.

In one embodiment, a Differentiated Services Code Point (DSCP) field is an 8-bit IP field used to support Quality of Service (QoS) and bandwidth allocation to different kinds of traffic across networks. Copying the original IP field to the RTP payload allows the receiver to detect if the IP DSCP field was changed in transit (e.g., to detect if an intermediate hop in the network modified the IP DSCP field). In one embodiment, the routing path is determined using the disclosed BGP route monitoring techniques (e.g., based on the IP address of Agent B's RTP endpoint, which can be determined during the disclosed SIP Register testing).

In one embodiment, a Checksum$_{RTP-H}$ (Checksum RTP Header) field and a Checksum$_{RTP-P}$ (Checksum RTP Payload) field are fields that are used to allow the Target Agent to detect if there was any change to either the header or the payload portions of the RTP packet. For example, some SIP Proxies can rewrite the RTP header, such as the timestamps and sequence numbers, for instance, while others may perform codec transcoding, which would completely modify the RTP payload.

In one embodiment, Timestamp and Sequence Number fields are copied to the payload to support cases in which the SIP Proxy rewrites the header. It should be noted that for the purpose of calculating the clock offset, the target agent does not use the timestamp in the Timestamp Request, so it is not present in the RTP payload. The clock offset is calculated at the sender, which needs access to the correct Timestamps t2 and t3, such that these fields are present in the RTP payload of the Timestamp Response as similarly described above.

In one embodiment, Task Id and Agent Id fields, in conjunction with the Round Id field, are used to allow the receiver to uniquely identify the test. When the Target Agent receives the first Timestamp Request packet, the Target Agent creates a temporary local entry mapping to the Source Agent's UDP connection, because these are the only messages that contain the entire set of test identifiers Task Id, Agent Id, and Round Id. When the Target Agent (e.g., Agent B) receives the RTP stream of messages from the Source Agent (e.g., Agent A), it can then uniquely identify the test. The local entry can be released after a specified amount of time or after the agent finishes calculating all the metrics for that particular test.

Generating a Stream(s) of RTP Packets for a Synthetic Call

In one embodiment, monitoring VoIP network services over the Internet includes performing active testing between endpoint agents (e.g., a Source Agent and a Target Agent) that includes generating a stream(s) of RTP packets for a synthesized voice/video call. In one embodiment, the Source Agent sends a stream of RTP packets to the Target Agent for mimicking/emulating an actual voice call (e.g., generating synthesized voice packets in the stream of RTP packets to facilitate voice call quality testing as described herein).

In one embodiment, video call quality can similarly be monitored using a second stream of RTP packets from the Source Agent to the Target Agent for mimicking/emulating an actual video call (e.g., to facilitate video call quality testing as described herein). For an actual video call, a user can specify the video codec, resolution, frame rate, and bit rate, or in a more user-friendly approach, those settings can be mapped into general bandwidth settings, such as low bandwidth, medium bandwidth, or high bandwidth.

In one embodiment, once the clock offset is estimated, the sender (e.g., Agent A) can generate an RTP stream with specially crafted RTP timestamps converted into the receiver's clock. By also sending the Round Id in the same message, the destination (Agent B) is able to convert the RTP timestamp into an absolute timestamp that is already synchronized to his own clock. This alleviates the need of the receiver knowing the clock offset and performing clock conversions.

Figure 7D:
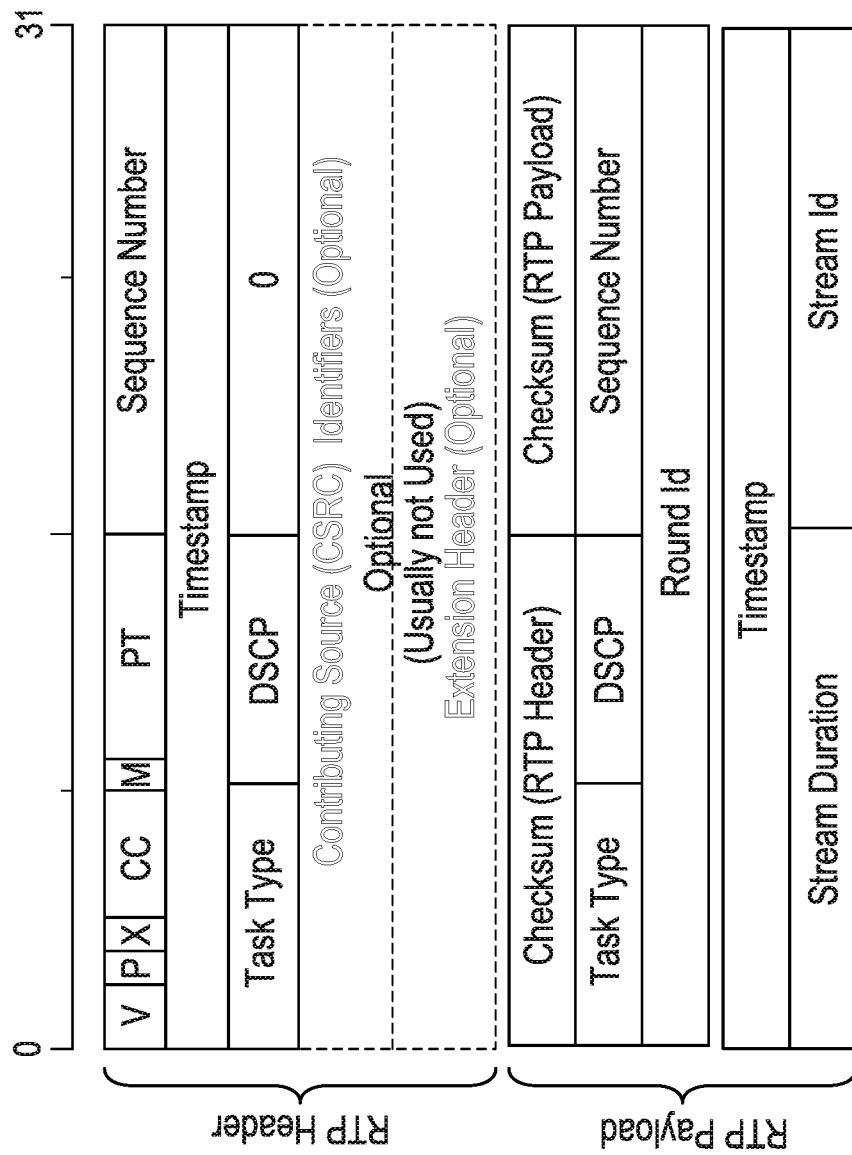
FIG. 7D illustrates a message specification of an RTP Stream message packet in accordance with some embodiments.

FIG. 7D illustrates a message specification of an RTP Stream message packet in accordance with some embodiments. Specifically, FIG. 7D shows the specification of the messages sent in the RTP stream from the Source Agent to the Target Agent, which have a Task Type with a value equal to 0x3. In addition to some of the above-described fields present in the Timestamp Request or Timestamp Response, the RTP Stream messages have a Stream Duration and Stream Id fields.

In one embodiment, the Stream Duration field is used to specify the length of the stream in seconds. Based on the Stream Duration and the codec (e.g., PT field), the destination can expect a certain number of packets to be received. This allows the destination to determine when an RTP stream has ended and can start the calculation of the voice quality metrics as described below.

In one embodiment, the Stream Id is used to allow multiple parallel RTP streams to be sent. In one embodiment, an increasing number of RTP streams are generated and sent to the Target Agent to simulate multiple concurrent voice calls (e.g., as further described below in the Voice Call Capacity Testing section).

Test Configuration for Synthetic Call Testing

For example, RTP tests can be executed periodically by sending synthetic voice streams from one or many Source Agents to a Target Agent. In order to send a stream of voice packets, the following parameters can be specified for the voice stream as will now be described.

Target Agent specifies the destination of the voice stream. Source Agent(s) specifies the list of agents that are sending voice streams to the Target Agent. Server address/port specifies the actual IP address (e.g., or hostname) and UDP port where voice streams are sent to.

Duration (e.g., Stream duration) specifies the overall duration of the voice stream (e.g., the total number of voice packets can also depend on the codec frame rate).

Codec specifies the codec used to encode the packets; this can be required as different codecs have different packetization methods and bit rates. Also, given their different impairment factor, they each have a specific maximum MOS. Example codec options include the following: G.711, G.722, G.722.1, G.723.1, G.726, G.729a, RTAudio, and SILK.

DSCP code specifies the IP header field used to provide Quality of Service (QoS) to the voice packets. Routers are generally able to prioritize traffic based on this value. Example possible values include the Assured Forwarding (AF) group and Class Selectors (CS) group. The default DSCP in the Internet is 0 (Best Effort).

De-jitter buffer size specifies the size of the buffer in milliseconds at the Target Agent side. For example, longer buffer sizes can create more delays in conversations but can also reduce the number of discarded packets for cases of high jitter.

Frequency specifies the time interval between test execution from each agent (e.g., test repeats every five minutes or some other time interval and/or on demand).

Metrics Computation for Synthetic Call Testing

In one embodiment, metrics are computed on the receiver side of the synthetic voice streams (e.g., at the Target Agent). The Source Agent generates a stream of UDP packets according to the test parameters, which may vary in overall duration, packet size, and rate. For instance, a 10 second G.711 voice stream, which operates at 64 kbit/s bitrate with a sampling frequency of 8 kHz, will result in 500 UDP packets, each one sent 20 milliseconds apart and containing two RTP frames.

Synthesized Voice Stream Validity

As an example, computing the voice metrics is based on an implementation in which the synthesized voice stream complies to certain criteria, such as the following criteria. The packetization is configured to conform to the codec (e.g., according to the specific codec parameters, each UDP packet holds a certain number of RTP frames of a specific size). In addition, the overall stream is configured to be sent at the correct rate, which is related to the codec's audio frame rate and number of frames per packet. Therefore, UDP packets in the stream are sent at a fixed interval according to the codec. Also, the duration of the synthesized voice stream is configured to be large enough to allow for accurate metrics.

In this example, software and hardware limitations of the agents are also considered for generating accurate metrics. Because these are not real-time systems, this example implementation operates on the expectation that part or all of the generated synthesized voice stream may not adhere to the above criteria. The packetization logic is the same in both the Sender and Target Agents, so this implementation can guarantee that the UDP packets conform to the codec's specification. Another criteria that may affect the validity of the voice stream is the rate at which the stream was generated and sent. A stream sent at a lower rate will be affected by network conditions in a different way than a stream sent at the correct rate, which may result in incorrect metrics. The Target Agent calculates and verifies the transmission rate of the sender by looking at the timestamps of each packet, included in the above-described custom RTP header and payload, such as shown in FIG. 7D.

For example, if a synthesized voice stream was sent at a rate lower than the codec's intended rate, it should generally not be used in the voice metrics computation. However, part of that voice stream may be valid and still provide accurate metrics. In an example case, the voice stream duration as configured in the test settings should be larger than the minimum voice stream duration required to obtain accurate metrics. In an example Target Agent implementation, a valid sub stream can require at least 50 packets to be sent at least at 80% of the intended codec's rate. In this example implementation, in the event of a voice stream being invalidated, such as by detecting that something disrupted the sender's transmission rate, the Target Agent can attempt to use part of that stream.

Loss Measurement

Generally, network congestion and queueing in routers can cause some packets (e.g., including voice packets for VoIP network services) to be dropped. For VoIP network services, dropped voice packets results in missing audio frames.

For example, a loss measurement computation can be calculated as shown below.

$$loss = frames\ lost/total\ frames$$

where total frames can be estimated as follows:

$$total\ frames = (max\ sequence\ number - min\ sequence\ number + 1) \times frames\ per\ packet.$$

In this example, the sequence numbers can be used because due to possible hardware or software delays in the Source Agents, it generally cannot be predicted exactly how many packets are going to be sent or used in the calculation due to the stream invalidation issue described above. Therefore, if the agent received 50 RTP packets (e.g., using a G.711 codec with 2 audio frames per packet) in which the lowest sequence number was 20 and the highest was 240, the total number of frames would be 440 (221 packets×2 frames per packet) and the number of received frames 100 (50 packets×2 frames per packet).

Discards Measurement

Network congestion or route changes can also cause some voice packets to be delayed. If the OWD is fairly stable, all packets will generally arrive at the same rate they were sent, although with a regular network latency. If the playback starts after the first packet arrives and the rest of the stream arrives at the expected playback rate, every audio frame will be played back. However, if the OWD is excessively unstable, some audio frames can be received past their playback time and are thus discarded. One common approach to minimize discards is to introduce an additional delay to the overall audio playback as discussed above. This audio buffer, called the de-jitter buffer, holds any received audio frame until its adjusted playback time is reached.

For example, the discard ratio can be calculated as shown below.

$$discard = frames\ discarded/total\ frames$$

where a frame discarded is a received frame past its playback time.

Playback time is the offset within the audio stream based on the codec rate and starting when the first audio frame was received, plus the de-jitter buffer size. For the effects of audio playback and even quality measurements lost frames are no different than discarded frames, however, it can be useful for determining which type is affecting the quality for VoIP services. For example, increasing the de-jitter buffer size can help the voice quality by absorbing the effects of network jitter and minimizing discarded audio frames.

Latency Measurement

Latency is generally defined as the average OWD of the overall voice stream. In one embodiment, to calculate the OWD, the receiver compares the sender's local timestamp (e.g., encoded in the above-described custom RTP header), which is already adjusted to the receiver's clock, to the current local time.

As an example, OWD of $i^{th}$ audio frame can be calculated as shown below.

$$owd\_i = t\_rec\_i - t\_sent\_i$$

where $t\_rec\_i$ is the local time at which frame $i^{th}$ was received and $t\_sent\_i$ is the time at which frame $i^{th}$ was sent, previously adjusted to the receiver's clock.

Packet Delay Variation Measurement

Packet Delay Variation (PDV) is generally defined as the difference between the OWD of the packets in a voice stream (e.g., see IETF RFC 3393, available at https://tools.ietf.org/html/rfc3393) and a reference value which is the minimum delay. Packets with high PDV are more susceptible to being discarded, because they have a higher chance of arriving past their playback time.

For example, the PDV of $i^{th}$ audio frame can be calculated as shown below.

$$pdv\_i = owd\_i - min\_owd$$

where min_owd is the minimum observed OWD.

In some cases, PDV is a useful metric to determine the minimum size of the de-jitter buffers, in particular, the maximum or the 99.9 percentile of the PDV. If the buffer is large enough to accommodate the maximum PDV, it should generally be able to play all audio frames without any discards.

MOS-CQE Measurement

In one embodiment, the Mean Opinion Score (MOS) is determined to provide a measure of the perceived audio quality for VoIP services. In an example implementation, the ITU-T recommendation can be used to calculate the MOS based on the E-model (equipment impairment factor method) (e.g., see ITU-T G.107 referenced above). This approach combines several impairment factors to calculate the transmission rating factor R, which is then mapped into an MOS value.

For example, the R factor can be calculated as follows:

$$R = R_0 - I_s - I_d - I_{e\text{-}eff} + A$$

where $R_0$ is the highest value of R that takes into account mainly the signal-to-noise ratio, $I_s$ comprises impairments that occur simultaneously with the voice signal, $I_d$ comprises impairments caused by delay, $I_{e\text{-}eff}$ is the equipment impairment factor, which mainly comprises impairments caused by distortion, and A is the advantage factor, which represents the user tolerance to the degradation of the voice quality. ITU-T defines $R_0 - I_s = 93.2$ as the default value specified for room noise conditions and signal levels and A=0 for wire-bound communications.

As a result, the R calculation can be represented as shown below.

$$R = 93.2 - I_d - I_{e\text{-}eff}$$

The delay impairment factor, $I_d$, can be calculated as shown below.

$$I_d = 0.024(T_a), \text{ for } T_a \leq 177.3 \text{ ms}$$

$$I_d = 0.024(T_a) + 0.11(T_a - 177.3), \text{ for } T_a 77.3 \text{ ms}$$

where $T_a$ is the absolute delay in echo-free connections, or the cumulative sum of all OWD components in a voice call using VoIP services.

For example, $T_a$ can be broken down into the algorithmic and packetization delay of the codec (e.g., such as look ahead time and how long is each a voice frame encoded into), the de-jitter buffer added latency, and the network latency or OWD (e.g., see Voice Over IP Performance Monitoring, Cole, R. G. and Rosenbluth, J. H., ACM SIGCOMM Computer Communication Review Vol 31 Issue 2 April 2001 pp 9-24), which results in the following calculation as shown below.

$$T_a = d_{codec} + d_{de\text{-}jitter\_buffer} + d_{network}$$

For example, the equipment impairment factor, $I_{e\text{-}eff}$, can be calculated as shown below.

$$I_{e\text{-}eff} = I_e + (95 - I_e) \frac{P_{pl}}{P_{pl} + B_{pl}}$$

where $I_e$ is the default equipment impairment value of the codec used under zero packet loss conditions, $P_{pl}$ is the random packet loss rate (e.g., which can be inferred from the loss and discard ratio), and $B_{pl}$ is the packet loss robustness factor assigned to each codec.

For example, using codec specific values for d_codec, $I_e$, and $B_{pl}$ that are well known to those skilled in the art (e.g., see ITU-T SG12 (e.g., estimates of $I_e$ and $B_{pl}$ parameters fora range of CODEC types) available at http://www.itu.int/en/ITU-T/studygroups/2013-2016/12/Pages/default.aspx; ITU-T G.113 (Revised Appendix IV—Provisional planning values for the wideband equipment impairment factor and the wideband packet loss robustness factor) available at https://www.itu.int/rec/T-REC-G.113; Integral and Diagnostic Intrusive Prediction of Speech Quality (2011), Nicolas Côté, Springer, Möller:2010 Instrumental estimation of E-model parameters for wideband speech codecs (2010), Sebastian Möller, Nicolas Côté, Valérie Gautier-Turbin, Nobuhiko Kitawaki, and Akira Takahashi, Journal EURASIP Journal on Audio, Speech, and Music Processing Archive, Volume 2010, January 2010, Article No. 9; and *Speech Quality of VoIP: Assessment and Prediction* (2007), Alexander Raake, John Wiley & Sons), and the calculated metrics from a voice stream: de jitter buffer size, OWD and loss and discard ratio, the R factor can be calculated and can be mapped into an MOS value as shown below.

$$\text{MOS} = 1 + 0.035R + R(R-60)(100-R)(7 \times 10^{-6}) \text{ for } R=1 \text{ to } 100$$

$$\text{MOS} = 4.5 \text{ for } R \geq 100$$

$$\text{MOS} = 1 \text{ for } R \leq 0$$

Increasing Codec Support by Inferring $I_e$ and $B_{pl}$

In some cases, the parameters $I_e$ and $B_{pl}$ of the codec are not known. Without those parameters, the MOS cannot be calculated using the above-described technique. However, in those cases where the maximum MOS and the MOS under certain loss are available, it is possible to derive $I_e$ and $B_{pl}$.

To derive $I_e$, max MOS (or R) for that codec can be determined, which is MOS under no loss and perfect network conditions, which can be calculated as shown below.

$$I_{e\text{-}eff} = I_e \text{ with } P_{pl} = 0$$

The result of this calculation is shown below.

$$R = 93.2 - I_d - I_e$$

Given that $I_d$ is known and R can be calculated (e.g., by solving R in equation R to MOS conversion), $I_e$ can thus be determined using the above equation.

To derive $B_{pl}$, MOS (or R) can be calculated for that same codec under a certain packet loss probability $P_{pl}$, using the two below equations.

$$I_{e\text{-}eff} = I_e + (95 - I_e) \frac{P_{pl}}{P_{pl} + B_{pl}}$$

and $$R = 93.2 - I_d - I_e + (95 - I_e) \frac{P_{pl}}{P_{pl} + B_{pl}}$$

Also, given that R can be calculated (e.g., by solving R in equation R to MOS conversion as also described above), $I_d$, $I_e$, $P_{pl}$, and $B_{pl}$ can thus be determined using the above two equations.

Network Path Tracing

In one embodiment, at the same time the RTP test is being performed (e.g., during a same time interval as the RTP-based synthetic voice testing is being executed in which the Source Agent sends the RTP stream as described above), a network path trace can be performed to provide visibility into the network path being used by the application (e.g., between the Source Agent and the Target Agent for the VoIP application). The disclosed techniques for performing such network path tracing are described further below in a Techniques for Performing Network Path Tracing section.

Complete Testing of Voice Call Establishment and Voice Call Quality

In one embodiment, a complete (e.g., SIP and RTP) test of the VoIP network services infrastructure is performed for monitoring VoIP network services over the Internet, including SIP registration, SIP session setup, and voice data transfer (e.g., RTP-based synthetic call testing). In particular, a VoIP call is established between a Source Agent and a Target Agent (i.e., UAC and UAS) through SIP. If the SIP session setup is successful, the Source Agent sends a stream of RTP packets to the Target Agent for mimicking/simulating an actual voice call (e.g., generating synthesized voice packets in the stream of RTP packets to facilitate voice call quality testing as described above). In one embodiment, video data can be similarly monitored using a second stream of RTP packets from the Source Agent to the Target Agent for mimicking/simulating an actual video call (e.g., to facilitate video call quality testing as described above).

It should be noted that the SIP session setup generally requires both UAs to register their location prior to initiating the voice call. Also, most SIP configurations require users to supply valid credentials (e.g., such as a username and a password) in order to grant access, such as to register a location or to initiate a call. For that reason, this SIP test generally requires a pair of credentials to be available to the agents, one for the Source Agent and another for the Target Agent.

In one embodiment, the destination of the voice call, which is the Target Agent in this example, periodically registers its location with its SIP Registrar (or SIP Proxy) before the previous registration expires (e.g., before 3600 seconds have elapsed). This periodic registration is useful so that when the Source Agent initiates the call setup, the Target Agent's SIP Registrar will be able to locate the Target Agent.

Figure 8A:
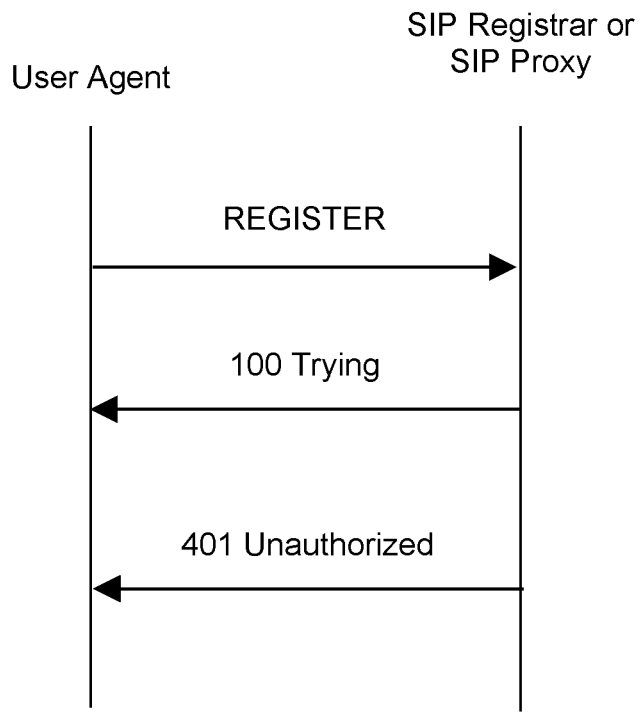
FIGS. 8A and 8B illustrate a SIP registration process.
Figure 8B:
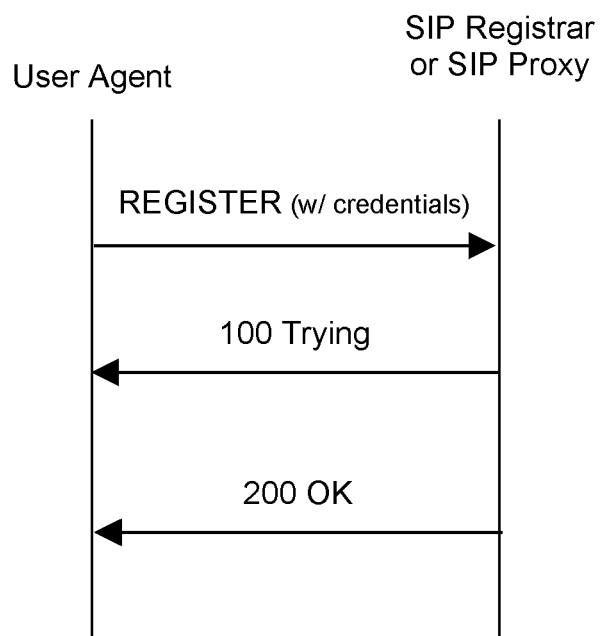

FIGS. 8A and 8B illustrate a SIP registration process. Referring to FIG. 8A showing phase 1 of the SIP registration process, the Target Agent (e.g., shown as a User Agent in FIGS. 8A and 8B) sends a SIP REGISTER message containing its SIP Endpoint (i.e., the address, protocol, and port where it is expecting to receive SIP requests). As also shown in FIG. 8A, if the SIP Server (i.e., SIP Registrar or SIP Proxy as shown in FIGS. 8A and 8B) requires authentication, then the SIP Server responds with a 401 Unauthorized message as shown or a 407 Proxy Authentication Required message containing a challenge that the Agent send back encrypted with its username and password (with credentials) as shown in FIG. 8B showing phase 2 of the SIP registration process. If the credentials are accepted or the server does not require authentication, it responds with a 200 OK message.

In one embodiment, the voice call establishment and quality test begins by having the Source Agent also register with its SIP Registrar (e.g., some SIP configurations may require the caller to be registered). The Source Agent registration also follows the same procedure depicted in FIGS. 8A and 8B as described above, and therefore may require the use of another set of credentials for the Source Agent. As such, it is also important that the Source Agent uses different user credentials than those used by the Target Agent (e.g., each of the Source Agent and the Target Agent should have their own distinct, valid credentials as described above).

Once the Source Agent is successfully registered with its SIP Registrar, it can optionally query the SIP Server for its capabilities by sending a SIP OPTIONS message and collecting the response (e.g., as similarly described above with respect to FIG. 3). For example, the SIP Server's response can then be matched against a regular expression (regex) (e.g., configured regex) to confirm if a particular capability is being advertised or not (e.g., this can be applied to verify capabilities, such as for cloud-based VoIP service providers that provide SIP Servers/services in the cloud, such as RingCentral and/or other cloud-based VoIP service providers, and can include using a cloud-based agent(s)).

The next step is the call setup. The Source Agent initiates the call setup by sending a SIP INVITE message containing its RTP endpoint (e.g., the address and UDP port where it is expecting to receive the RTP packets of the synthesized audio stream). FIG. 2 shows a typical SIP session setup between a UAC (e.g., the Source Agent) and a UAS (e.g., the Target Agent) as described above.

Once the SIP INVITE message reaches the Target Agent, it follows the standard SIP behavior by replying with a 180 Ringing message followed by a 200 OK message containing its own RTP endpoint information (e.g., the IP address and UDP port where the Target Agent is expecting to receive the RTP stream from the Source Agent). In this example, there is no need for the Target Agent to start early media, so it can just start listening on its RTP endpoint.

Eventually, the Source Agent will get the 200 OK SIP response message, containing the Target Agent's RTP endpoint information, that signals the successful completion of the SIP Session Setup in this example SIP testing.

The final step of this example complete test of the VoIP network services infrastructure is to send the RTP stream (e.g., a stream of RTP packets of the synthesized audio stream) from the Source Agent to the Target Agent, using the RTP Endpoints from both agents (e.g., determined during the above-described example SIP testing). In an example implementation, this is similar to the voice call quality testing described above in the Voice Call Quality Testing section. First, the Source Agent calculates the clock offset by sending a few Timestamp Requests (e.g., such as shown in FIG. 7B) to the Target Agent's RTP endpoint and collecting the respective Timestamp Responses (e.g., such as shown in FIG. 7C). The pair with the smallest OWD is then used to estimate the clock offset (e.g., as described above in the Estimating a Clock Offset section).

The Source Agent then generates an RTP stream (e.g., a stream of RTP packets of the synthesized audio stream), which it sends to the Target Agent. As discussed above, the rate of the stream of RTP packets and the total payload size of the RTP packets (i.e., the audio frames) is generally defined by the codec. As also discussed above, instead of actual audio data, the RTP payload contains the above-described custom RTP Stream message format (e.g., such as shown in FIG. 7D).

In this example voice data transfer testing (e.g., using a stream of RTP packets of the synthesized audio stream), the timestamps included in the RTP stream messages can be received and processed by the Target Agent to calculate a series of metrics/measures, including loss and one-way delays. The Target Agent can then use the calculated loss and one-way delays to calculate MOS and PDV, as explained in more detail in the Voice Call Quality Testing section.

Test Configuration for Complete Testing of Voice Call Establishment and Voice Call Quality For example, the input parameters of the test can include the following input parameters as will now be described.

Target Agent's SIP Endpoint specifies the hostname or IP address, protocol, and port of the SIP Registrar above or a SIP Proxy (e.g., default 5060 for non-TLS and 5061 for TLS). Target Agent's SIP Registrar URI specifies SIP URI that contains the hostname of the SIP Registrar where the Target Agent will register its location. Target Agent's SIP username and password specify the credentials that the Target Agent will use to register its location in the Target Agent's SIP Endpoint.

Source Agent's SIP Endpoint specifies the hostname or IP address, protocol, and port of the SIP Registrar above or a SIP Proxy (e.g., default 5060 for non-TLS and 5061 for TLS). Source Agent's SIP Registrar URI specifies SIP URI that contains the hostname of the SIP Registrar where the Source Agent will register its location. Source Agent's SIP username and password specify the credentials that the Source Agent will use to register its location in the Source Agent's SIP Endpoint.

Expected REGISTER response code specifies the expected SIP response code from the Source Agent's SIP Registrar to the Source Agent (e.g., 200 OK, 401 Forbidden, or 404 Not found).

Use SIP OPTIONS and SIP OPTIONS regular expression specify a flag indicating that the Source Agent should query the Source Agent's SIP Registrar for its advertised capabilities and a regular expression (regex) to match the respective response, such as ".*Accept:[,;=a-zA-Zo-9]+application/sdp*".

Duration specifies the overall duration of the voice stream (e.g., the total number of voice packets can also depend on the codec frame rate).

Codec specifies the codec used to encode the packets; this can be required as different codecs have different packetization methods and bit rates. Also, given their different impairment factor, they each have a specific maximum MOS. Example codec options include the following: G.711, G.722, G.723, G.726, and G.729a.

DSCP code specifies the IP header field used to provide QoS to the voice packets. Routers are generally able to prioritize traffic based on this value. Example possible values include the AF group and CS group. The default DSCP in the Internet is 0 (Best Effort).

De-jitter buffer size specifies the size of the buffer in milliseconds at the Target Agent side. For example, longer buffer sizes can create more delays in conversations but can also reduce the number of discarded packets for cases of high jitter.

Frequency specifies the time interval between test execution from each agent (e.g., test repeats every five minutes or some other time interval and/or on demand).

In this example, network path tracing can be performed using the same packets as the application test (e.g., SIP messages from Source Agent to Source Agent's SIP Endpoint and RTP Stream messages from the Source Agent to Target Agent).

Metrics Computation for Complete Testing of Voice Call Establishment and Voice Call Quality For example, this particular test (i.e., the above-described complete test of the VoIP network services infrastructure is performed for monitoring VoIP network services over the Internet, including SIP registration, SIP session setup, and voice data transfer) can determine several aspects in the correct implementation of a SIP infrastructure as will now be described.

This particular test can verify whether the Source Agent is able to contact the SIP Registrar (e.g., communication can be performed through a SIP Proxy or even with SIP Redirection) as described herein.

This particular test can verify whether the registration process is behaving accordingly (e.g., if a known username/password is being accepted or rejected) as described herein.

This particular test can verify whether the Source Agent's SIP Registrar server is correctly advertising or hiding its capabilities in the SIP OPTIONS response as described herein.

This particular test can verify whether the session setup was successful as described herein.

This particular test can verify the quality of a potential real voice call by calculating MOS, among other metrics, as described herein.

This particular test can utilize the Checksum (e.g., Checksum of the RTP Header or Payload) so that the Target Agent can determine if there was any rewrite in the RTP header (e.g., possibly due to the use of a SIP Proxy or another modification/rewrite by a network device along the network path), as described herein.

SIP Session Setup

In one embodiment, all the stages in the SIP Session Setup are presented as a sequence of phases that have either passed or failed. For example, the sequence of pass/fail phases can include the following: (1) DNS resolution of the SIP Endpoint's hostname; (2) TCP connection to the SIP Endpoint if using TCP; (3) the Source Agent successfully sent a SIP REGISTER message, because it received a 401 or 407 response with a challenge; (4) the Source Agent successfully registered its location with the SIP Server because it got a 200 response; (5) the Source Agent successfully sent a SIP INVITE message, because it received a provisional SIP response; (6) SIP Servers forwarded the SIP INVITE, because the Target Agent received the message; and/or (7) Source Agent received a 200 OK message from the Target Agent.

In one embodiment, in addition to pass/fail status for each of the stages in the SIP Register and SIP Invite, the Source Agent is instrumented to compute timing metrics. Example timing metrics can include the following: (1) DNS resolution time to the SIP Endpoint; (2) TCP connection establishment time (e.g., if redirection was performed, then the Source Agent can be configured/instrumented to only measure the time regarding the last SIP Server); (3) total register time (i.e., latency of final response to an initial SIP REGISTER message); and/or (4) total invite time (i.e., latency of final response to the initial SIP INVITE message).

If the Source Agent receives one or more SIP Redirect responses, then the above-described timing metrics concern only the last redirected SIP Server.

For example, the Source Agent can also be configured/instrumented to track a Redirection Total Time (i.e., the total time from the beginning of the test until the final redirected SIP Server was found).

SIP Server Advertised Capabilities

In one embodiment, the agent can query the server for its capabilities (e.g., see Section 11—Querying for Capabilities of IETF RFC 3261 referenced above) by generating and sending the SIP OPTIONS command as described above. A specific capability or capabilities can be determined to be supported by the SIP Server if its response matches a specific regular expression (regex) configured in the test settings. By continuously monitoring the SIP Server's configured capabilities (e.g., at every frequency interval), the agent can immediately identify and alert if and when the server is misconfigured (e.g., an alert can be sent to a VoIP/network administrator, such as via an electronic communication, a dashboard alert, or another type of communication of the alert(s)).

In one embodiment, in addition to the previous metrics, the agent (e.g., UA) can also be configured/instrumented to check if the response to the SIP OPTIONS matches the provided regular expression.

Voice Quality Testing for Complete Testing of Voice Call Establishment and Voice Call Quality In one embodiment, the voice quality testing is similar to the voice quality testing embodiment described above in the Voice Call Quality Testing Using a Synthetic VoIP Stream section, with the difference of using the Target Agent's RTP Endpoint obtained from the SIP Session Setup, as opposed to using the manually configured/instrumented address/location value from the test settings.

Network Path Tracing

In one embodiment, at the same time the Source Agent sends the RTP stream (e.g., during a same time interval as this RTP-based testing is being executed by the Source Agent), a network path trace can be performed (e.g., a network path trace can be triggered) to provide visibility into the network path being used by the application (e.g., between the Source Agent and the Target Agent's RTP Endpoint obtained from the SIP Session Setup for the VoIP application). Techniques for performing such network path tracing are described in the next section.

Techniques for Performing Network Path Tracing

In one embodiment, at the same time a Source Agent sends the sequence of voice packets (e.g., voice/video quality testing using the above-described generated stream(s) of RTP packets for a synthesized voice/video call as described above) or SIP messages (e.g., SIP session setup testing as described above), it also performs a network path trace to the destination (e.g., target endpoint for the respective test as described above).

For example, the network path trace can be performed by the Source Agent that is configured/instrumented to send a sequence of UDP packets with increasing IP Time-To-Live (TTL) values that carry similar payloads to the voice packets. Once the destination receives the UDP packets, the destination replies, which can be received and processed by the Source Agent as an indication to determine when to terminate the network path trace.

In this example, by analyzing the ICMP Time Exceeded packets received from different hops on the way to the destination, the Source Agent can determine various different characteristics of the network path. Example characteristics of the network path can include the following: (1) sequence of router interfaces from source to destination; (2) forwarding loss of each interface (e.g., and terminal interfaces); (3) DSCP changes at the link level; (4) link delay; (5) MPLS tunnel inference and routing labels; and/or (6) path MTU and MTU decrements.

The collective of all these metrics is referred to herein as network path trace. In one embodiment, except for the DSCP changes at the link level, MPLS tunnel inference and routing labels, and path MTU and MTU decrements which are each described herein, the network path trace is collected using the techniques for measuring data paths as described in co-pending U.S. Patent Application Publication No. US20130311832 entitled CROSS-LAYER TROUBLE-SHOOTING OF APPLICATION DELIVERY filed Mar. 15, 2013, which is incorporated herein by reference for all purposes, including an excerpt of paragraphs [0082]-[0087] providing a description of measuring data paths to perform the above-described network path, which is reproduced below.

Measuring Data Paths Using Network Path Tracing

Traceroute is generally a computer network diagnostic tool for displaying the route (path) and measuring transit delays of packets across an Internet Protocol (IP) network. While a traceroute diagnostic using ICMP packets can be used to measure data paths, such an approach may not be effective on some networks as many ISPs block ICMP packets. Accordingly, in some embodiments, in order to collect data paths, Time To Live (TTL) limited TCP SYN packets are sent to a specific destination server. Routers reply with a TTL Time Exceeded message every time they receive a packet with TTL=1 (e.g., set counter to 1, which is decremented to 0 in IPv4 by routers each time they are processed by router; add one to the TTL to keep extending the path an extra hop; repeat 3 times for destination to map out path, as shown in the below pseudo code sample). Thus, probes are sent with increasing TTL to collect the source IP addresses of the ICMP packets to reconstruct the path packets are taking. In some cases, special precaution can be taken to avoid issues with load balancing. In the case of TCP, if the same 5 tuple (e.g., source IP, destination IP, source port, destination port, and protocol) is kept between probes, balancers will send packets in that flow through the same interfaces.

As shown below in Algorithm 1, a sample pseudo code scheme is provided in accordance with some embodiments for measuring data paths using TCP SYN packets as discussed above.

Algorithm 1: Data path measurements.

```
MAX_ROUNDS=3;
For vRound=1 to MAX_ROUNDS
    For vTTL=1 to 255
        vReply =
        SendTCPPacket(vTTL,vDestination,vSourcePort,vDestPort);
        If vReply!=null
            push(vHops[vRound],vReply);
        End If
    End For
    //distinguishing nodes with losses from non-responding nodes
    If vDestination not in vReply
        Mark last responding node as lossy
    End If
End For
```

Because the final hop is a TCP server, we should always expect a TCP SYN ACK packet back from the server. If that does not happen, then it either means that the server is not reachable at layer 3 or that the application stopped at the server. Note that some hops in the path might not send ICMP TTL Exceeded messages, so the server SYN ACK is used as a reference. If there are non-responsive hops after a certain point on the way to the server and if the destination server replies with a TCP SYN ACK, then we assume that those hops do not send ICMP TTL Exceeded (so there is no packet loss). On the other hand, if a SYN ACK is not received from the server, and we have non-responsive hops after hop X in the path, then we assume X is one hop way from the point where packets are being dropped—that is, the last known good hop in the data path.

Below is an example illustrating hops in a data path and whether or not a response is received on such hops on a path between a start (e.g., a Source Node) and a Destination Node.

START→[IP-1→responsive]→[no response]→ . . . →[no response]→[Destination Node]

In this example, if we do not receive a response from the Destination Node, then in this case we would identify the hop at IP-1, which did respond (the last known good hop) as the path termination point.

Visualization of Data Paths Determined Using Network Path Tracing

In one embodiment, various techniques for visualization of data paths determined using the above-described network path tracing techniques are provided. In one embodiment, data delivery is represented in the network in a per-hop model in which each hop represents an interface of a physical router. In one embodiment, a graph of a data path visualization of a data path from a source (e.g., Source Agent) to a destination (e.g., the SIP Server, the Target Agent's RTP Endpoint, or another destination) is provided, such as similarly described in co-pending U.S. Patent Application Publication No. US20130311832 entitled CROSS-LAYER TROUBLESHOOTING OF APPLICATION DELIVERY filed Mar. 15, 2013, which as mentioned above is incorporated herein by reference for all purposes, and such as further described below with respect to FIG. 9.

Figure 9:
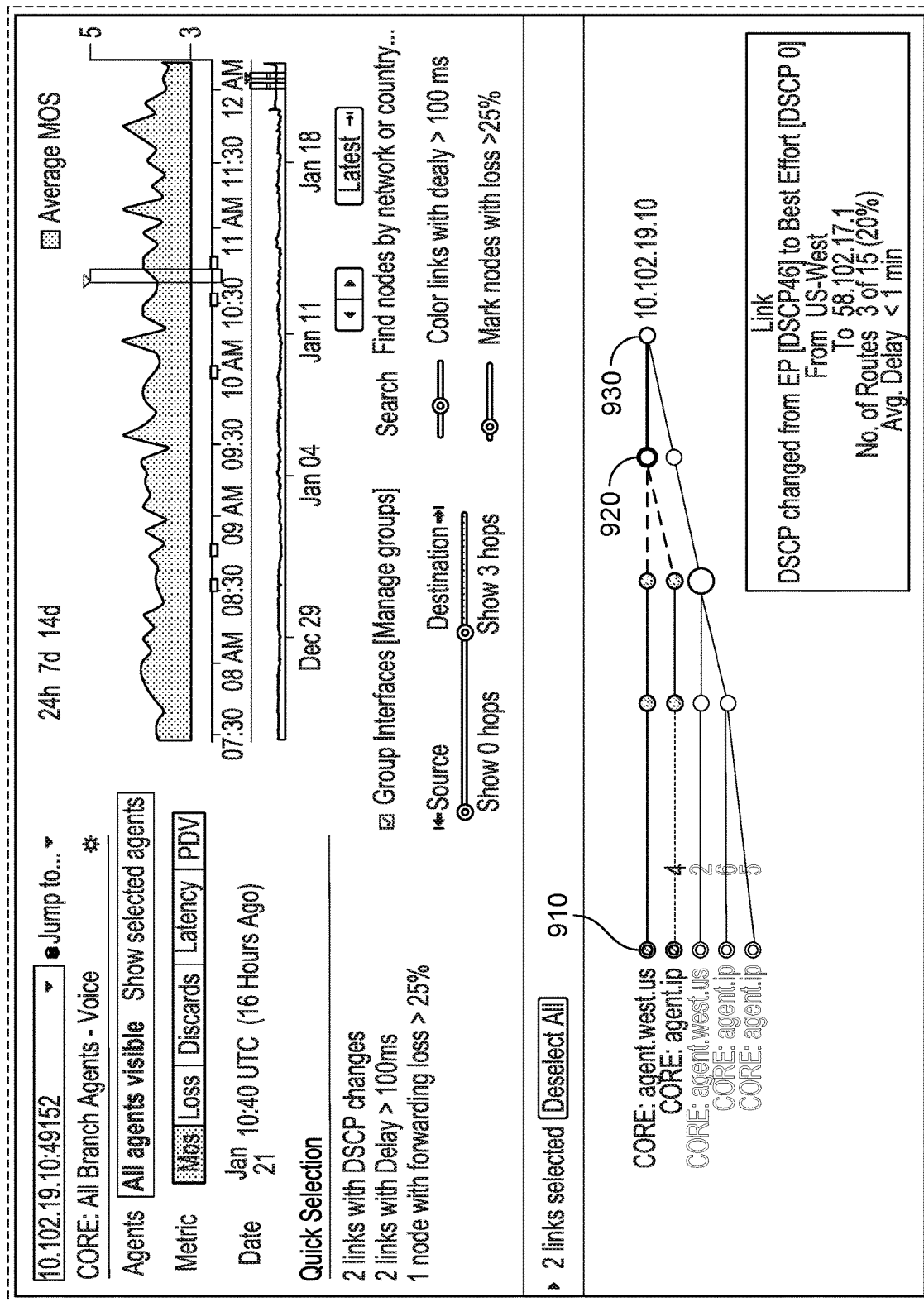
FIG. 9 illustrates a visualization of network paths determined using network path tracing for a test from multiple Source Agents to a Target Agent in accordance with some embodiments.

Path Visualization for Monitoring and/or Troubleshooting VoIP Network Services Over the Internet FIG. 9 illustrates a visualization of network paths determined using network path tracing for a test from multiple Source Agents to a Target Agent in accordance with some embodiments. Specifically, FIG. 9 shows an example path visualization of network paths determined using network path tracing for a test from five Source Agents to the Target Agent at 10.102.19.10 and port 49152.

Referring to FIG. 9, the Source Agents are depicted on the left side of the path visualization, including, for example, a Source Agent identified as Core: agent.west.us as shown at 910 in FIG. 9, and the Target Agent on the right side of the path visualization as shown at 930 in FIG. 9.

As shown in FIG. 9, each node in the path represents an interface forwarding voice traffic. The dashed links represent the two links where there were changes to the DSCP field in the IP header of packets that were detected using the disclosed techniques. In one embodiment, the DSCP values are collected from the quoted headers in the ICMP Time Exceeded packets received from the interfaces, and, as a result, where in the path the DSCP values change can be determined (e.g., by the Source Agent receiving and processing the ICMP Time Exceeded packets received from the interfaces). In some cases, detection of such DSCP value changes can indicate that such devices that change DSCP values may not be well configured to carry voice traffic (e.g., VoIP traffic) and can create performance degradation for VoIP network services. Therefore, it can be useful to identify such devices that change DSCP values in the network path (e.g., downgrading the quality of the routing for the packets, and if the device/router that was identified as changing the DSCP value is a device/router in the enterprise's own network, then the enterprise may be able to resolve if it is a device/router configuration error or some other problem associated with that enterprise's device/router).

As also shown in FIG. 9, a node at 920 (e.g., indicated as a red node in an example implementation of the path visualization view or using some other visual indicator) is indicated as changing the DSCP from EF (Expedited Forwarding) to Best Effort, creating some forwarding loss in the interface and a subsequent drop in the MOS score.

For example, after merging the path traces from all the Source Agents (e.g., five Source Agents in this example), a more accurate representation of forward loss and link delay is obtained, and the root cause of performance degradation for VoIP network services can be determined with greater accuracy using the disclosed techniques.

Voice Call Capacity Testing

In one embodiment, the concept of capacity testing for voice calls is similar to the one of available bandwidth. For example, this can be implemented as a periodic test (e.g., or a one-time test, such as an on-demand test) where the inputs are the same as the single voice call test described above, but in this case can include the following: (1) Source Agent, Target Agent, and codec details, as described above in the Test Configuration subsection of the Voice Call Quality Testing section; (2) maximum number of calls; (3) minimum acceptable MOS score; and (4) frequency (e.g., every five minutes or some other interval of time). The disclosed capacity testing for voice calls can be performed during a planning/predeployment phase and/or during an operation phase/deployed VoIP network services phase (e.g., to verify capacity for VoIP services to be deployed, currently deployed, or to be expanded).

In this example, the capacity test uses a ramp model to generate calls where calls are stacked over time until the aggregate MOS score of all the calls (e.g., $90^{th}$ percentile) drops below a certain threshold. As such, the capacity test will identify the maximum number of calls that the network can handle at that time with an acceptable call quality.

In one embodiment, at the same time the capacity test executes, the Source Agent also performs a network path trace to the destination (e.g., target endpoint for the respective test as described above to provide visibility on the network path taken by the application). For example, successive path traces can be performed while the capacity test is being executed in order to capture metrics from the network at different load times.

Example Use Case: Voice Quality Drop Caused by Packet Loss

Figure 10:
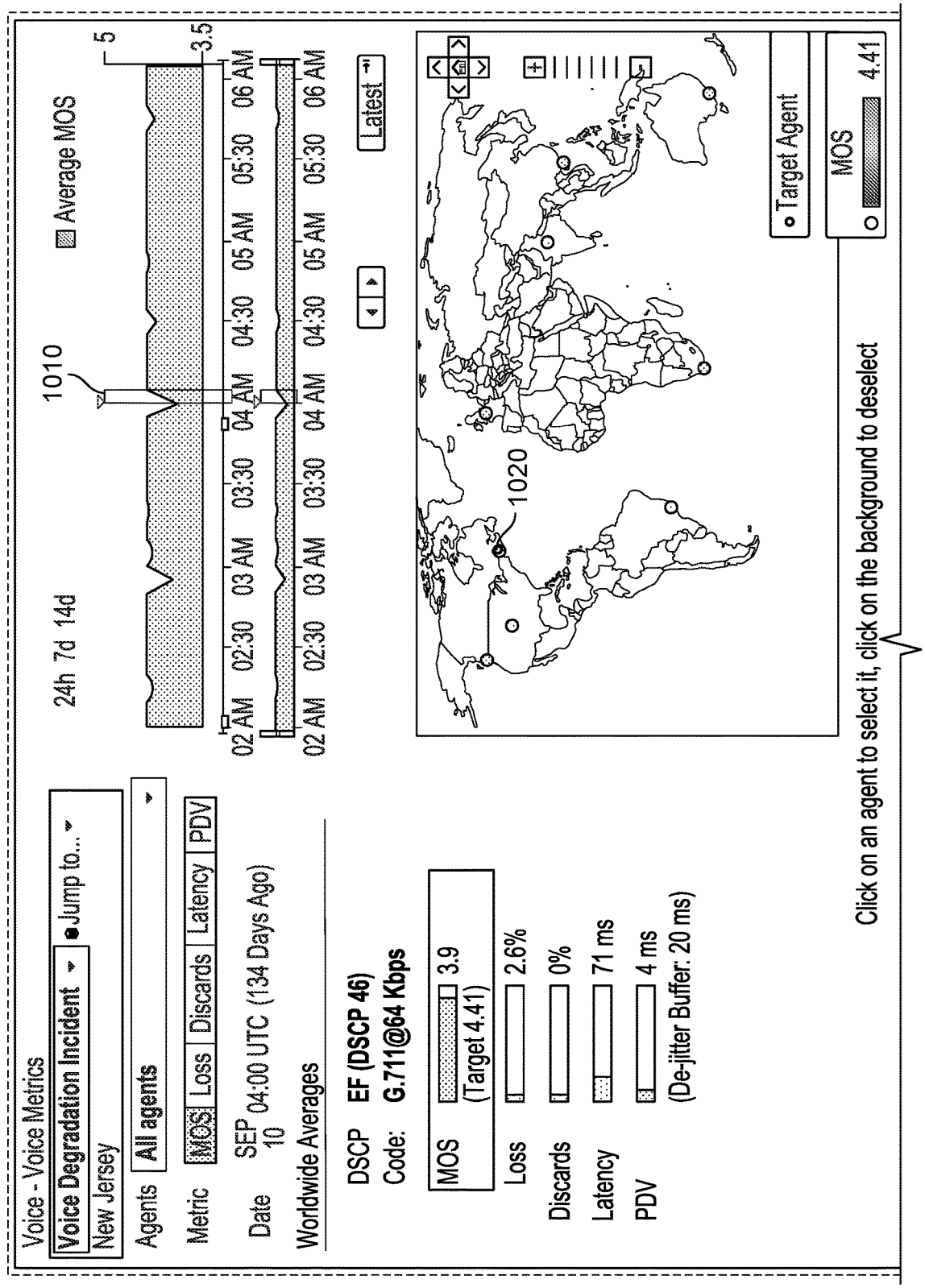
FIG. 10 illustrates an example use case of a synthetic voice test configured from multiple Source Agents to a Target Agent in accordance with some embodiments.
Figure 10:
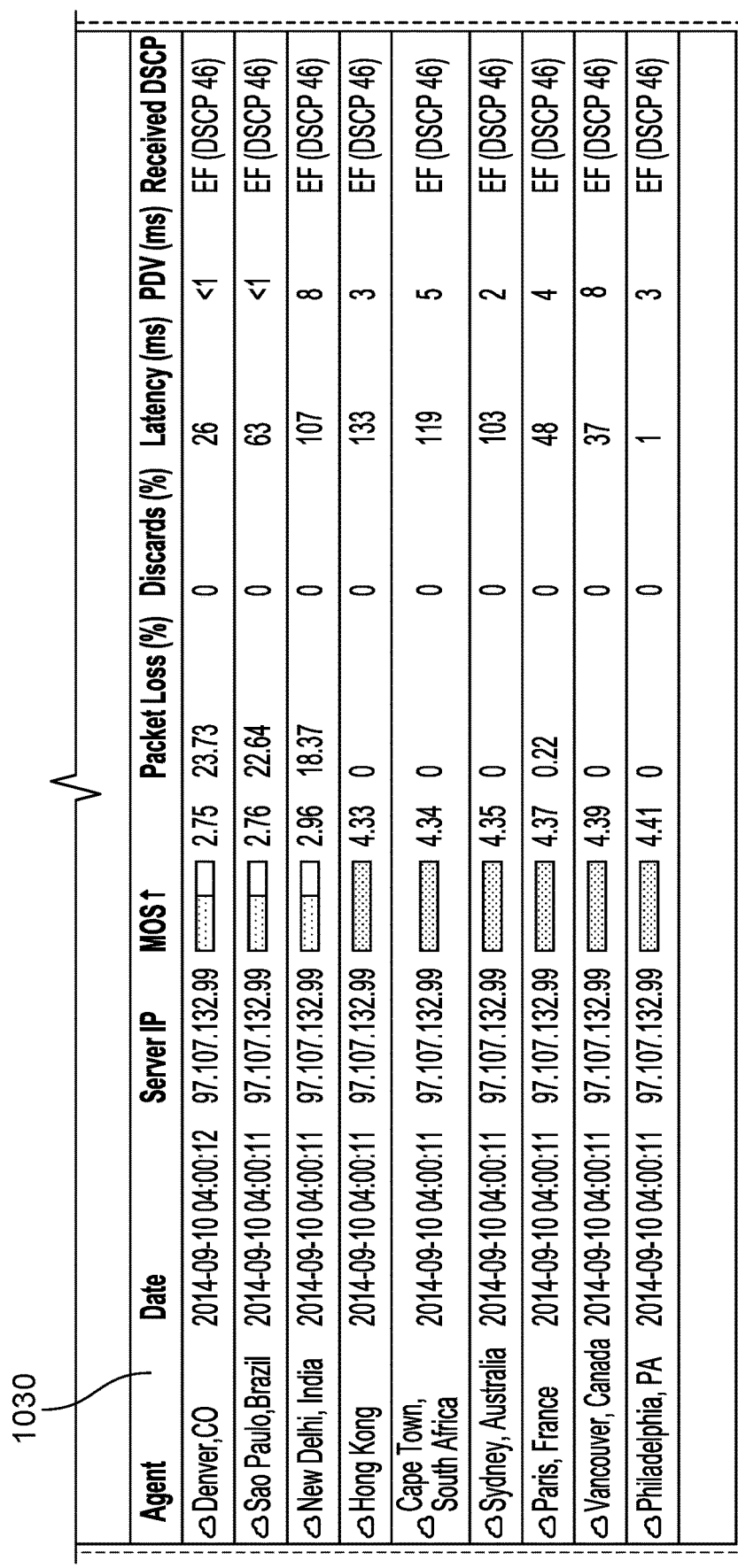

FIG. 10 illustrates an example use case of a synthetic voice test configured from multiple Source Agents to a Target Agent in accordance with some embodiments. Specifically, FIG. 10 illustrates an example of a voice test configured from the nine Source Agents to the Target Agent in New Jersey shown at 1020 (e.g., indicated using a blue double circle in the map in an example implementation of a graphical visualization or some other visual indicator). By looking at the time-series of the MOS averaged across all of the agents (e.g., shown in the top right of FIG. 10), drops in the value are indicated as shown at 1010. As also shown in FIG. 10, the MOS scores of each individual agent at a given time interval are provided as shown in a table 1030, and table 1030 also reveals that there are three agents (e.g., Denver, Sao Paulo, and New Delhi in this example) with very low MOS (e.g., <2.95). As also shown, the average loss is at about 2.6%, which is a leading indicator that somewhere in the network packets are being dropped.

Figure 11:
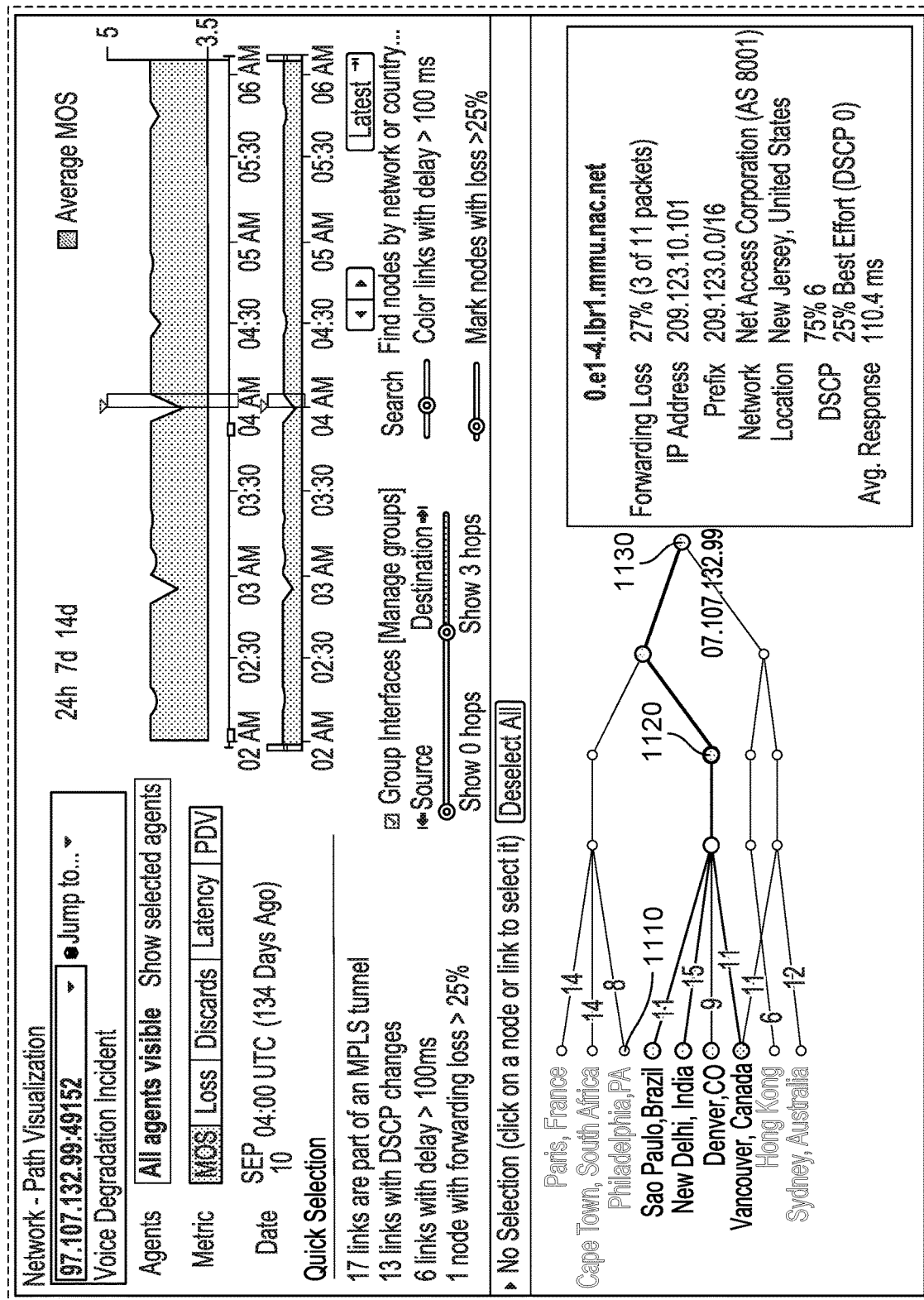
FIG. 11 illustrates a path visualization view for this example use case of a synthetic voice test configured from multiple Source Agents to the Target Agent in accordance with some embodiments.

FIG. 11 illustrates a path visualization view for this example use case of a synthetic voice test configured from multiple Source Agents to the Target Agent in accordance with some embodiments. In this example use case, after jumping to the path visualization view (e.g., a screen that provides a graphical visualization of the path determined using the disclosed techniques), the same test, time interval, and agents are shown, but the network path dimension, from the sources as shown at 1110 in FIG. 11 to the Target Agent as shown at 1130 in FIG. 11, can be explored using the path visualization view. A highlighted node as shown at 1120 (e.g., indicated as a red node in an example implementation of the path visualization view or using some other visual indicator) indicates an interface with forwarding loss (e.g., 27% in this example), and each of the three affected agents are using that interface in the network path. As such, this means that 27% of the voice packets that arrive at interface 209.123.10.101 are being dropped between 209.123.10.101 and the next hop, in this case, most likely in the input queue of the next hop. As such, by combining the end-to-end metrics with the path trace information, the root cause of the issue down to the interface level can be identified using the disclosed techniques.

Figure 12:
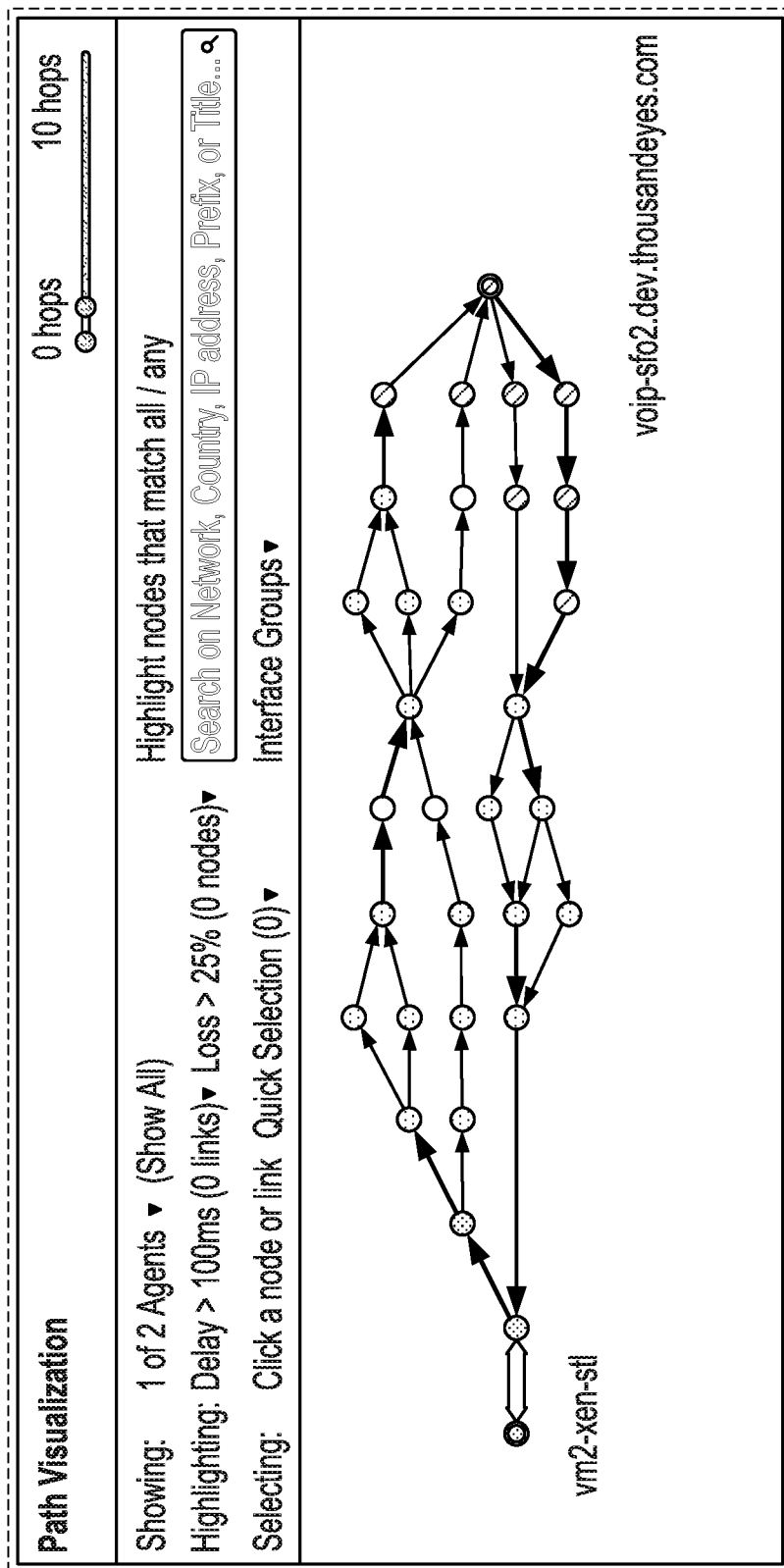
FIG. 12 illustrates a visualization of bidirectional paths determined using network path tracing for a test from a Source Agent to a Target Agent in accordance with some embodiments.

Path Visualization of a Bidirectional Path for Monitoring and/or Troubleshooting VoIP Network Services Over the Internet FIG. 12 illustrates a visualization of bidirectional paths determined using network path tracing for a test from a Source Agent to a Target Agent in accordance with some embodiments. Specifically, FIG. 12 shows an example path visualization of bidirectional paths determined using network path tracing for a test from the Source Agent to the Target Agent as described above. As shown in this example, the path(s) from the Source Agent to the Target Agent are different (at least in part) than the path(s) from the Target Agent to the Source Agent. As such, the disclosed techniques that include performing active testing between the Source Agent and the Target Agent can be performed in either direction and/or bi-directionally (e.g., A to B and/or B to A) as different problems can be detected from different directions of VoIP call initiations. For example, the path visualization of such a bidirectional path can facilitate monitoring and/or troubleshooting VoIP network services over the Internet (e.g., identifying a performance degradation or other problem such as packets being dropped at a node/hop that is on one of the distinct data paths between the Source Agent and the Target Agent).

A Platform for Monitoring VoIP Network Services Over the Internet

In one embodiment, a platform for monitoring VoIP network services over the Internet includes a distributed framework to distribute tests across different agents. For example, agents can be executed on client devices, server devices (e.g., physical and/or virtual server computing environments), and/or other computing devices, which are controlled by agent controllers to perform one or more tests as further described herein, in which the test results can be collected for correlation and analysis, as further described herein with respect to various embodiments. In one embodiment, agents are computing resources that are controlled, and, for example, can be either virtual or dedicated servers. Agents can be distributed across different geographies and networks, for example, distributed agents can be distributed to mostly Tier-1 and Tier-2 networks to avoid the noise of bad connectivity of last mile connections.

Figure 13:
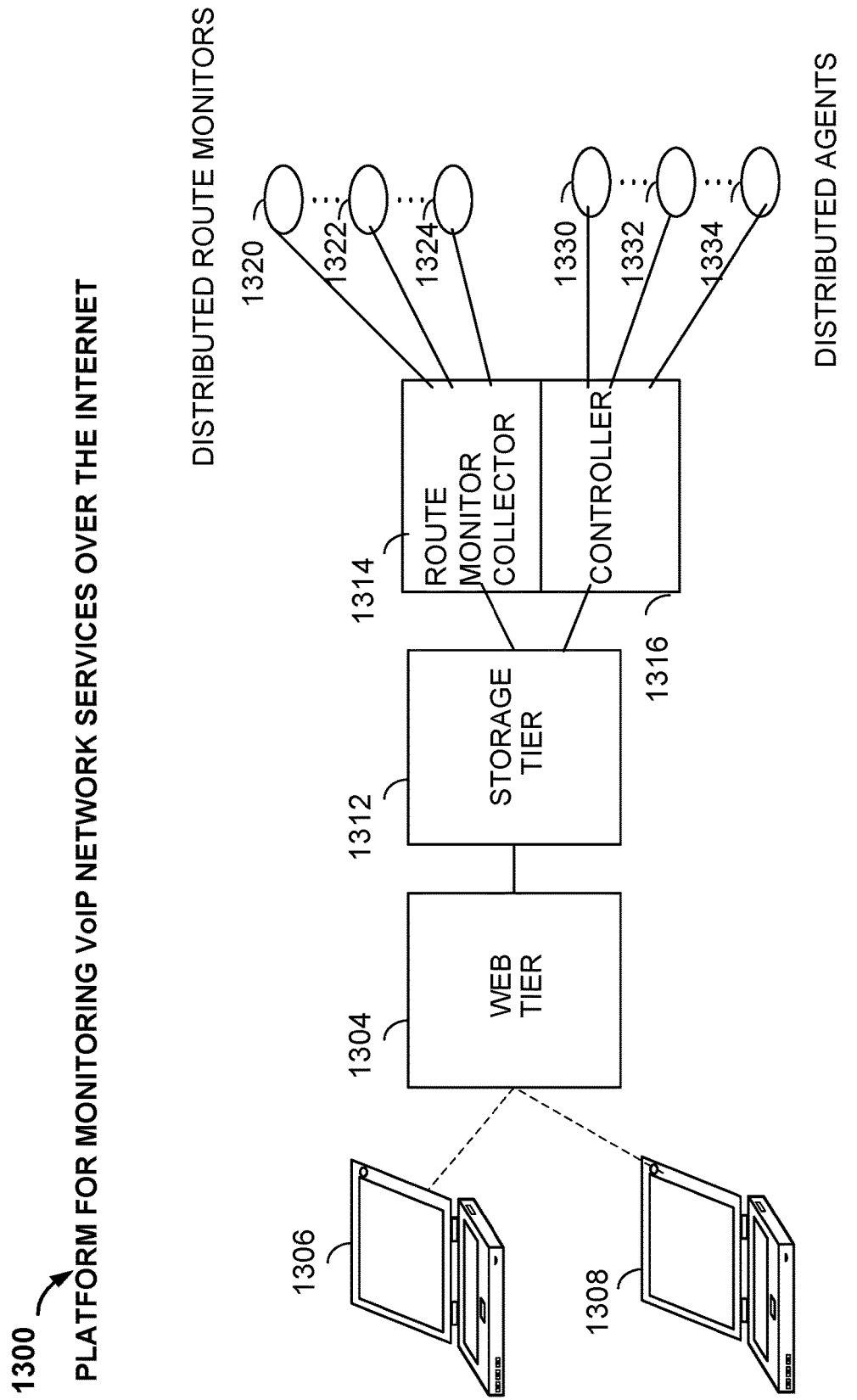
FIG. 13 illustrates a functional block diagram of a platform for monitoring VoIP network services over the Internet in accordance with some embodiments.

An example of a system architecture for monitoring VoIP network services over the Internet is shown in FIG. 13 as described below.

FIG. 13 illustrates a functional block diagram of a platform for monitoring VoIP network services over the Internet in accordance with some embodiments. In particular, FIG. 13 illustrates an environment in which a platform for monitoring VoIP network services over the Internet 1300 includes distributed agents 1330, 1332, and 1334 (e.g., which can be distributed across various geographies and/or devices for performing different types of tests and/or targeting different sites, locations, and/or metrics, as described above) that collect data based on configured tests, and the distributed agents 1330, 1332, and 1334 send this data to a controller(s) 1316 (e.g., agent controllers). The controller 1316 stores the data in a storage tier 1312 (e.g., providing permanent storage) that can be used by a web tier 1304 to generate visualizations and reports to users accessing the platform 1300 using client devices (e.g., computers, laptops, smartphones, and/or various other computing devices).

For example, a report based on one or more tests can be output to a user to present the collected and analyzed VoIP network services over the Internet. Example reports can include various visualizations and/or diagnostic information, such as similarly described above. In an example implementation, the report can facilitate monitoring and/or troubleshooting VoIP network services to determine, for example, whether performance problems are the result of VoIP application related configuration problems/errors, network problems (e.g., the cloud provider of the VoIP application, the customer's own internal IT network, an enterprise network of the target, and/or intermediate network providers between the Source Agent executed on a client/server device and the cloud provider or the Target Agent executed on another client/server device), and/or other configuration/performance issues, such as described above. The report can also include recommendations to the user (e.g., IT/network/VoIP admin) to resolve any such determined problems associated with the monitored VoIP application. In some cases, the report can also be provided to a third party, such as the SaaS provider of the VoIP application and/or a network provider, which can be provided as information to indicate the source of such determined problems associated with the VoIP application.

In the example shown, the user of client device 1306 (hereinafter referred to as "Bob") is employed as an IT manager of a company that provides cloud-based VoIP network services ("VoIP Services Company"). The user of client device 1308 (hereinafter referred to as "Alice") is employed as an IT manager of a national company ("ACME Company"). As will be described in more detail below, Bob and Alice can each access the services of platform 1300 (e.g., platform for monitoring VoIP network services over the Internet) via web tier 1304 over a network, such as the Internet. The techniques described herein can work with a variety of client devices 1306 and 1308 including, but not limited to personal computers, tablet computers, smartphones, and/or other computing devices.

In one embodiment, platform 1300 generates various reports based on results of the network performance tests to facilitate monitoring VoIP network services over the Internet, as described herein. In one embodiment, platform 1300 includes a data store, such as storage tier 1312 for storing results of the tests and/or the reports for monitoring VoIP network services over the Internet.

In one embodiment, a set of agent controllers 1316 is provided as shown to send various tests (e.g., such as the various tests described herein with respect to various embodiments) to the distributed agents for execution by the distributed agents. For example, agents can be deployed and executed on client/server devices (e.g., on customer/enterprise premises for the disclosed Source and Target Agents for active VoIP network services testing of enterprise to enterprise VoIP set-up/calls, cloud agents for the disclosed Source and Target Agents for active testing of enterprise to cloud/any geography VoIP set-up/calls, and/or on devices in a cloud-based VoIP service provider's network for active testing of the cloud-based VoIP service provider's VoIP network services to their customers and/or to cloud/any geography VoIP set-up/calls) and/or on hosted providers using cloud computing distributed across multiple ISPs, which are controlled by the agent controllers to perform one or more tests as described herein, in which the test results can be collected for correlation and analysis, as described herein with respect to various embodiments.

In one embodiment, the tests are configured through a web interface by a user. For example, typical parameters can include the frequency of various tests, the target of the tests, and the agents (e.g., or locations) where the tests are to be performed. The test parameters can be sent from the controller (e.g., agent controllers 1316) to the distributed agents after an agent checks in (e.g., using a pull mechanism). After an agent executes a test, the agent can export the test result(s) back to the controller. The controller can then provide the results back to a data store (e.g., storage tier 1312) for permanent storage (e.g., or temporary storage). Besides periodic tests, controller 1316 can also send on-demand tests to an agent(s) through, for example, a Remote Procedure Call (RPC) call for immediate or on-demand execution.

In one embodiment, platform 1300 is a scalable, elastic architecture and may comprise several distributed components, including components provided by one or more third parties. Further, when platform 1300 is referred to as performing a task, such as storing data or processing data, it is to be understood that a sub-component or multiple sub-components of platform 1300 (whether individually or in cooperation with third party components) may cooperate to perform that task.

Referring to FIG. 13, FIG. 13 also illustrates an environment in which the platform can monitor (VoIP) network services availability using distributed BGP routing feeds collected from distributed route monitors 1320, 1322, and 1324 that communicate routing feeds to a route monitor collector 1314 (e.g., a route monitor component of platform 1300, such as further described below). For example, the distributed route monitors can include public monitors and private monitors that are distributed across various geographies and/or networks (e.g., including, in some cases, private enterprise networks) for collecting BGP routing feeds, such as further described below. Route monitor collector 1314 stores the collected BGP routing feed data in storage tier 1312 (e.g., providing permanent storage) that can be aggregated (e.g., into bins/rounds as further described below) and then used by web tier 1304 to generate visualizations and reports to users accessing the platform 1300 using client devices (e.g., computers, laptops, smartphones, and/or various other computing devices that can execute, for example, a web browser to access the platform (1300) for monitoring (VoIP) network services availability using distributed BGP routing feeds).

In one embodiment, the plurality of distributed route monitors includes public monitors and private monitors, and the route monitor component collects BGP routing feeds from each of the public monitors and private monitors. In one embodiment, the BGP routing feed data collected from the plurality of distributed public and private monitors is aggregated and stored in a storage tier (e.g., which can include a database or another type of data store). In one embodiment, the plurality of distributed agents is controlled by an agent controller. In one embodiment, the network performance test results from the plurality of distributed agents for the plurality of layers are stored in a storage tier (e.g., which can include a database or another type of data store). In one embodiment, the graphical visualizations, reports, and/or alerts of the monitored VoIP network services, such as described herein, are generated by platform for monitoring over the Internet 1300, such as shown in FIG. 13. Techniques for route monitoring using BGP Routing Feeds will now be further described below.

Collecting BGP Routing Information

In one embodiment, BGP route data collection is disclosed for collecting BGP routing information as discussed below. For example, BGP route data collection can be implemented using public route monitors and private route monitors for collecting BGP routing information as further described below.

Figure 14:
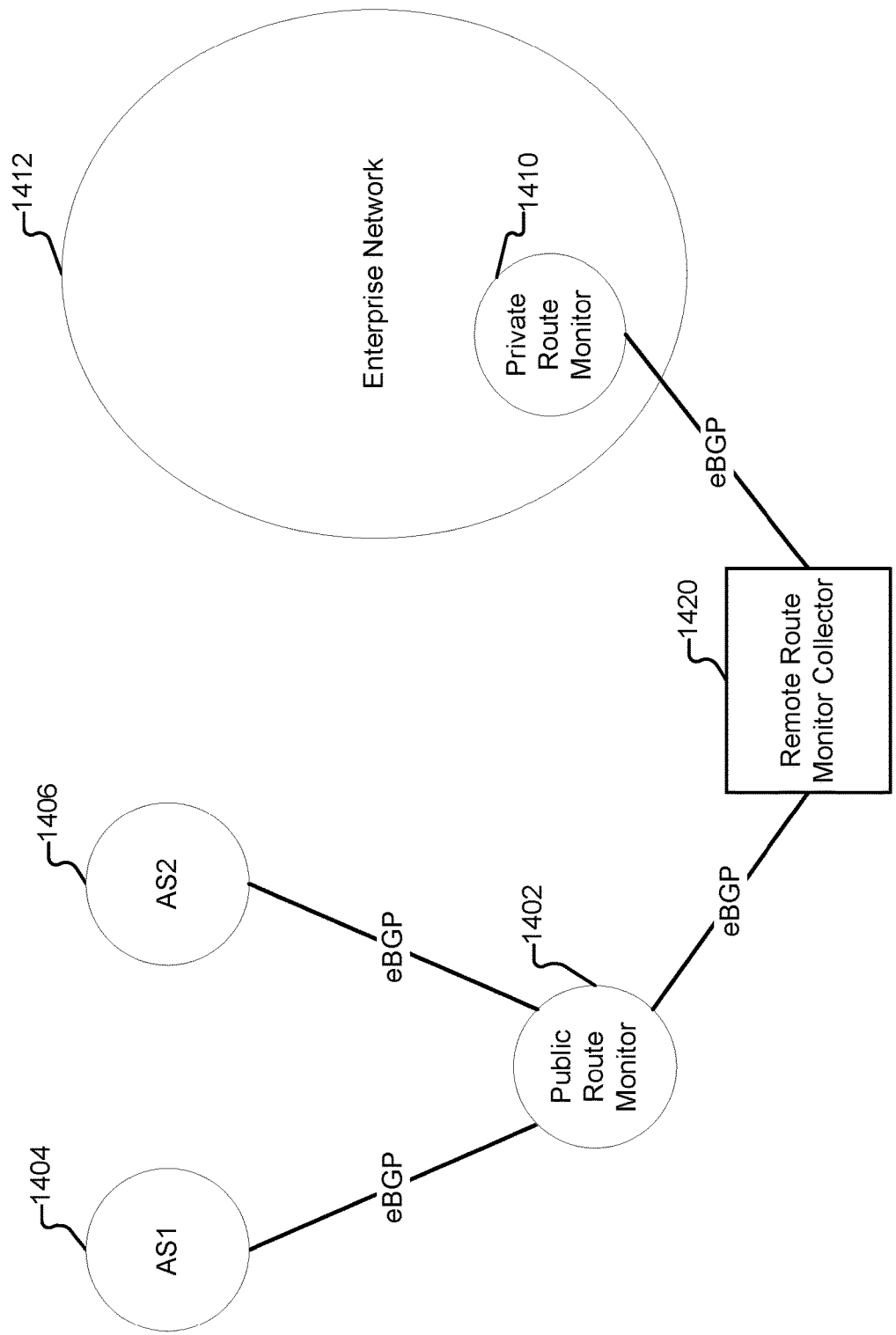
FIG. 14 is a network diagram illustrating public and private route monitors for collecting BGP routing information for monitoring service availability using distributed BGP routing feeds in accordance with some embodiments.

FIG. 14 is a network diagram illustrating public and private route monitors for collecting BGP routing information for monitoring service availability using distributed BGP routing feeds in accordance with some embodiments. In one embodiment, both public route monitors and private route monitors are used to collect BGP route data for monitoring service availability using distributed BGP routing feeds, as further described below.

In one embodiment, a public (route) monitor is a router that establishes a BGP session with a collector (e.g., a route monitor collector, such as route monitor collector 1314 as shown in FIG. 13, or open projects provide such collectors and make such collected BGP data publicly available) to send BGP routing updates and BGP routing table transfers. For example, the collector can be implemented as a BGP routing daemon that has multiple sessions established with public monitors, and can periodically archive such updates and routing tables into disk for storage (e.g., this data can then be processed and written into a database). As further described below, there are several projects that make collector data publicly available, including RouteViews (e.g., available at http://www.routeviews.org) and RIPE-RIS (e.g., available at http://www.ripe.net/ris).

In one embodiment, a private (route) monitor is a router located inside a given entity's network (e.g., a customer's/subscriber's enterprise network). For example, one or more routers inside the entity's network can be configured to establish BGP sessions with a collector (e.g., a route monitor collector, such as route monitor collector 1314 as shown in FIG. 13). For example, the collector can be implemented as a BGP routing daemon that has multiple sessions established with private monitors, and can periodically archive such updates and routing tables into disk for storage (e.g., this data can then be processed and written into a database).

Referring to FIG. 14, a public route monitor 1402 (e.g., a public monitor) collects BGP routing information from a plurality of AS, shown as AS1 at 1404 and AS2 at 1406. For example, the public monitor can collect BGP routing information periodically via an eBGP session with a border router of each of AS1 and AS2. As further described below, BGP routing feeds can include collecting BGP routing information from distributed public monitors.

As similarly described above, eBGP sessions are used between respective routers in each of the AS systems to provide updates (e.g., if eBGP routing tables have been updated). The eBGP routing table data is provided as open projects, RouteViews, and/or RIPE-RIS, which makes such eBGP routing table data publicly available.

In one embodiment, BGP routing information is collected from public BGP data repositories that collect, aggregate, and archive routing information from a plurality of routers (e.g., hundreds of routers) across the Internet using public monitors, such as further described below. For example, BGP route information can be collected from RouteViews (RV) (e.g., RV can be used for collecting BGP route information for the Internet in the United States) and/or RIPE-RIS (e.g., Routing Information Service, which can be used for collecting BGP route information for the Internet in Europe), which collects and publishes BGP route information for the Internet.

As also shown in FIG. 14, a private route monitor 1410 (e.g., a private monitor) is a router inside an enterprise network 1412 in communication with a remote collector shown as remote route monitor collector 1420 via e-BGP sessions (e.g., in an example implementation, remote route monitor collector 1420 can be implemented using route monitor collector 1314 as shown in FIG. 13). A main difference between a public monitor and a private monitor is that routing feeds from the private monitor are generally not publicly accessible. As further described below, BGP routing feeds can also include collecting BGP routing information from distributed private monitors. For example, private monitors can be used to represent BGP routing information for one or more entities that are subscribers (e.g., for subscriber enterprise network domains) to the monitoring service availability using distributed BGP routing feeds, such as further described below. As an example, one or more routers in a subscriber's enterprise network (e.g., a router in each of the subscriber's sites/data centers/geographies, etc.) can be configured to have eBGP sessions with the remote route collector (e.g., such that the remote collector can receive eBGP routing table data for the enterprise network via eBGP sessions (multi-hop TCP sessions)).

For example, by looking at the AS_PATH BGP attribute of each message sent from a router R, the routing path that R used at each time can be determined. In addition, this information can also be used to determine when a certain destination IP address (e.g., or prefix) is/was not reachable from R, such as further described below. As described herein with respect to various embodiments, the BGP route information can be correlated with various other layers of network information to allow for visualization of this data and analysis of this data in a manner that facilitates cross-layer visibility and troubleshooting of application delivery (e.g., to determine if a problem is caused by a BGP routing information related problem, data path packet loss related problem (e.g., congestion), HTTP related problem, DNS related problem, and/or some other network-related problem).

Historic BGP routing tables and messages are typically archived in a standard format for analysis purposes (e.g., using the Multithreading Routing Toolkit (MRT) export format, which is a compressed data format that is specified in IETF RFC 6396, available at https://tools.ietf.org/html/rfc6396). In one embodiment, public monitors collected BGP route data and private monitors collected route data are stored in a common and/or standard format, such as the MRT format.

In one embodiment, private BGP monitors provide routing information on how entities (e.g., customers/subscribers to the monitoring service availability using distributed BGP routing feeds) reach external sites/services over the Internet. For example, private monitors can identify the routes that are utilized by a given entity (e.g., a device within the enterprise network of the entity, such as ACME Company) that reach a given distributed application, such as a web site/service (e.g., SaaS providers, such as salesforce.com, google.com, and/or other web site/service providers).

In one embodiment, public monitors provide information on how external users can reach a given customer's/subscriber's data centers/devices. For example, public monitors can identify the routes that are utilized to reach a given distributed application, such as a web site/service (e.g., SaaS providers, such as salesforce.com, google.com, and/or other web site/service providers).

As similarly described above, BGP routes are generally advertised/available to facilitate interconnectivity of devices across the Internet. For example, the pinterest.com website domain resolves to the IP address 23.23.131.240. An examination of routing tables for announced address blocks that cover this IP address indicates that this IP address falls under IP address block 23.22.0.0/15 announced by AS 14618 belonging to Amazon, as shown below.

$whois-h whois.cymru.com "-v 23.23.131.240"
AS|IP|BGP Prefix|CC|Registry|Allocated|AS Name
14618|23.23.131.240|23.22.0.0/15|US|arin|2011-09-19|AMAZON-AES—Amazon.com, Inc.

By performing an analysis of BGP routing information available at a RouteViews route server (e.g., available at telnet://route-views.routeviews.org), different AS paths available to reach the IP address block 23.22.0.0/15 can be determined. As shown in the case below, there are 31 different routes that are available to reach the destination. However, the router only selects one route, generally referred to as the BGP best path, which is selected after determining several route attributes pursuant to the BGP protocol, including BGP Local Preference and AS Path length.

route-views>sh ip bgp 23.23.131.240
BGP routing table entry for 23.22.0.0/15, version 636446191
Paths: (31 available, best #8, table Default-IP-Routing-Table)
   Not advertised to any peer
   3277 39710 9002 16509 14618
      194.85.102.33 from 194.85.102.33 (194.85.4.4)
      Origin IGP, localpref 100, valid, external
      Community: 3277:39710 9002:9002 9002:64789
   852 16509 14618
      154.11.98.225 from 154.11.98.225 (154.11.98.225)
      Origin IGP, metric 0, localpref 100, valid, external
      Community: 852:180
   3356 16509 14618
      4.69.184.193 from 4.69.184.193 (4.69.184.193)
      Origin IGP, metric 0, localpref 100, valid, external
      Community: 3356:3 3356:22 3356:100 3356:123 3356:575 3356:2006 65000:0 65000:7843
. . .

BGP/Routing Metrics

In one embodiment, BGP data collection can be used to determine BGP metrics (e.g., also referred to herein as routing metrics, which can be aggregated over time in bins/rounds) as discussed below. For example, various BGP metrics can be determined from BGP routing information collected using the BGP data collection techniques disclosed herein. As also further described below, BGP/routing metrics can be applied to generate various BGP visualizations and/or reporting, which can facilitate cross-layer troubleshooting and/or service monitoring using distributed BGP data feeds as disclosed herein.

In one embodiment, collected and aggregated BGP data is organized by n-tuples. In an example implementation, the BGP data is organized by a 3-tuple (monitor, prefix, round). In this example 3-tuple, the monitor parameter identifies the source of the route, the prefix parameter identifies the destination network, and the round parameter identifies a round (e.g., a bin) over which the BGP data is aggregated.

In one embodiment, BGP data is processed for prefixes of interest (e.g., targets/destinations of interest to a given customer/subscriber of the disclosed service). This technique generally allows for a subset of the BGP data to be processed. In an example implementation, customers (e.g., an IT/network admin) can input prefixes of interest (e.g., salesforce.com, google.com, etc.) using a BGP test (e.g., IT/network admin inputs BGP prefixes of interest). In another example implementation, the prefixes of interest can be determined automatically by converting hostnames to IP addresses from different agents, and further mapping IP addresses to prefixes. In some cases, a combination of automated and manual entry and/or review of automated techniques can be implemented to determine prefixes of interest for applying the disclosed techniques for generating BGP metrics using the collected BGP data.

In one embodiment, BGP data is collected and aggregated to provide BGP metrics per round. For example, a round can refer to a time interval/window (e.g., 15-minute interval of time or another predetermined period of time) over which BGP data is collected and aggregated.

The aggregation over time bins can provide a more user understandable view of the BGP data over time and facilitate service monitoring using distributed BGP data feeds, such as further described herein. For example, aggregating the collected BGP data over given periods of time facilitates enhanced reporting and visualization of the BGP data (e.g., as opposed to existing BGP data tools that merely attempt to show BGP data per event/change, such as the BGPlay tool that provides event-by-event data, available at http://bg-playjs.com/ and http://bgplay.routeviews.org/). As such, a bin of metrics for each n-minute window of BGP data can capture various BGP metrics, including, for example, path changes, reachability, and number of BGP updates, as further described below.

In one embodiment, a plurality of different BGP/routing metrics is generated using the collected and aggregated BGP data. Example BGP metrics include one or more of the following: (1) reachability, (2) number of path changes, and (3) number of BGP updates, which are each further discussed below. From the point of view of a router (or route monitor), reachability generally refers to the fraction of time that the router can reach a certain destination prefix. Path changes generally refers to the number of times the attribute AS_PATH changed for a certain destination prefix. Updates generally refers to the plain count of BGP update messages received during a given round (e.g., a predetermined time interval/window of 15 minutes or some other predefined period of time).

In an example implementation, the BGP metrics (e.g., also referred to as routing metrics) are monitored per prefix, and computed based on the MRT files. For example, BGP metrics can be computed periodically or based upon events (e.g., based upon updates to the MRT data feeds from public and/or private monitors or upon request/demand for updated report(s) including BGP metrics and/or monitored routing information).

In this example, BGP metrics (e.g., also referred to as routing metrics) per monitor can include one or more of the following: (1) path changes, (2) reachability, and (3) number of updates (e.g., also referred to as updates), which are each further discussed below.

In one embodiment, path changes is an example routing metric that can provide a total number of BGP path changes over the timespan of a given round (e.g., a route withdrawal can be counted as a path change; in this case, BGP updates that change attributes other than ASPATH are not captured by this metric).

In one embodiment, reachability is an example routing metric that can provide a percentage of time there was a route to a given prefix in the BGP/routing table during a given round (e.g., a reachability value of 0% for this metric would indicate that the prefix was not reachable at all during the entire round).

In one embodiment, number of updates is an example routing metric that can provide a total number of BGP updates observed from a given (public/private) route monitor to a given prefix during a given round.

Figure 15:
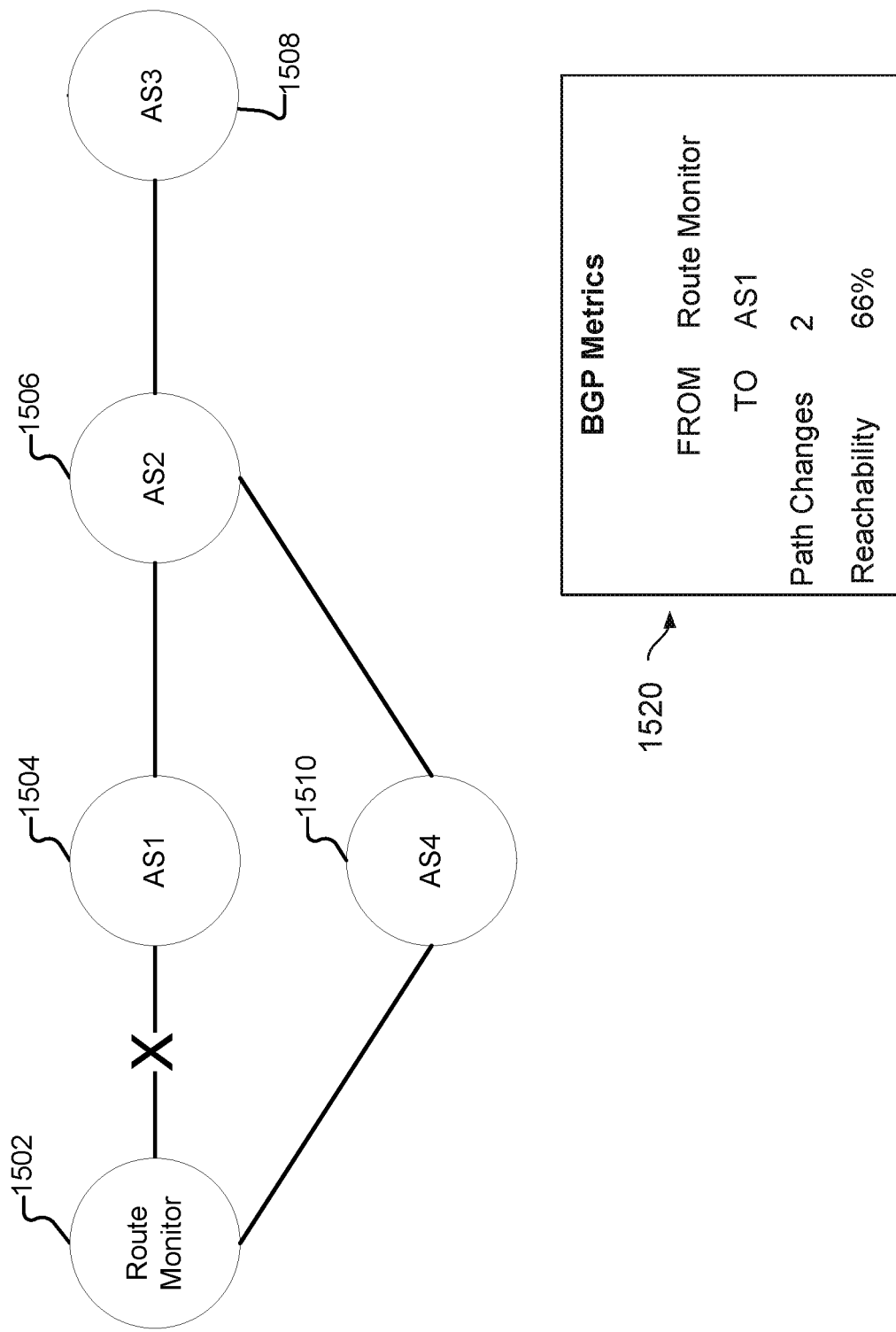
FIG. 15 is a network diagram that illustrates an example scenario if a route between a route monitor and a given Autonomous System (AS) is unavailable.

FIG. 15 is a network diagram that illustrates an example scenario if a route between a route monitor and a given Autonomous System (AS) is unavailable. As shown, FIG. 15 illustrates an example scenario if a route between a route monitor 1502 (e.g., a public route monitor or a private route monitor) is unavailable between the route monitor and AS1 1504. As a result, route monitor 1502 would switch to the alternative route through AS4 1510, which allows route monitor 1502 to be able to reach the destination via AS2 1506 and AS3 1508.

In this example, the route path change as shown in FIG. 15 would count as one path change during this example round/time window (e.g., BGP data can be aggregated for a 15-minute window of time or another time period can be used for each round, such as similarly described above). If another route change occurs during this example round/time window, such as when the previously unavailable route from route monitor 1502 to AS1 1504 returns (e.g., assuming that the route becomes available again during this example round/time window), then that would count as a second path change during this example round/time window. Assuming unavailability for 5 minutes during that 15-minute period, then the reachability metric to AS1 1504 from route monitor 1502 would be calculated to be equal to 66% (e.g., only 10 minutes out of the 15-minute time period could the destination be reached during this example round/time window, assuming the round/time window is a 15-minute time window). The BGP metrics for this example scenario from route monitor 1502 to AS1 1504 are shown in 1520: two path changes and calculated reachability equal to 66% for this example round/time window.

As described above, the disclosed BGP route monitoring techniques can be applied to facilitate monitoring VoIP network services over the Internet.

Techniques for determining network path characteristics including MultiProtocol Label Switching (MPLS) tunnel inference and route labeling as well as path MTU and MTU decrements will now be described below.

Inferring MPLS Tunnels

In some embodiments, MultiProtocol Label Switching (MPLS) tunnel inference for characterizing and/or annotating links/nodes is provided using various techniques described below. For example, depending on the implementation of RFC4950 or the TTL-Propagate configuration parameter on routers, there can be different types of MPLS tunnels. The below table provides a description of the options.

| Tunnel Type | RFC4950 | TTL-propagate |
|---|---|---|
| Explicit | Enabled | Enabled |
| Implicit | Disabled | Enabled |
| Opaque | Enabled | Disabled |
| Invisible | Disabled | Disabled |

Explicit MPLS Tunnel

Figure 16A:
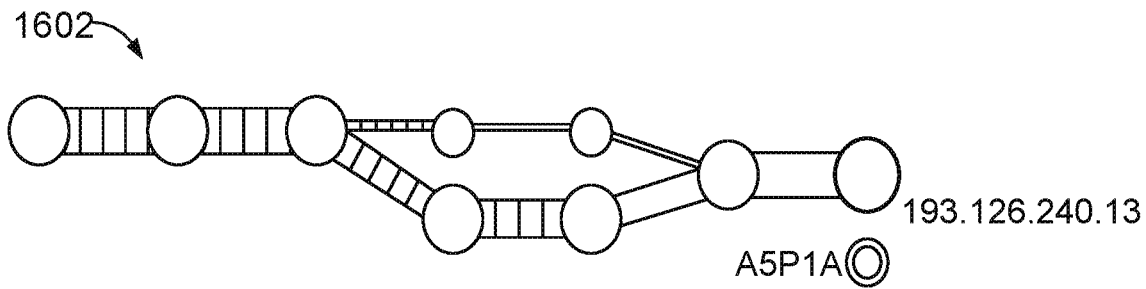
FIG. 16A illustrates a graph of a visualization of routing paths including a link that is indicated to be part of an explicit MPLS tunnel in accordance with some embodiments.
Figure 16A:
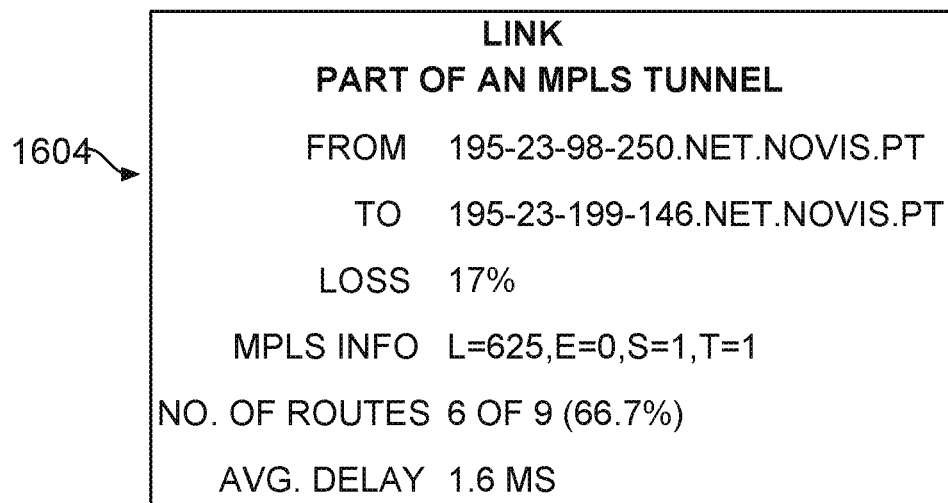

FIG. 16A illustrates a graph of a visualization of routing paths including a link that is indicated to be part of an explicit MPLS tunnel in accordance with some embodiments. For example, explicit MPLS tunnels (e.g., tunnels not obscured using router configuration) can be displayed in full, with the links between each hop of an MPLS network being shown, including with label information. In this example implementation, when an MPLS hop is detected in the path, a quick selection link can be provided to identify links that are part of MPLS networks, and display the label stack used to route the packet, when hovered over an affected link. Referring to FIG. 16A, a link 1602 is determined to be part of an explicit MPLS tunnel, and link information that is provided using the label information is shown at 1604.

Implicit MPLS Tunnel

Figure 16B:
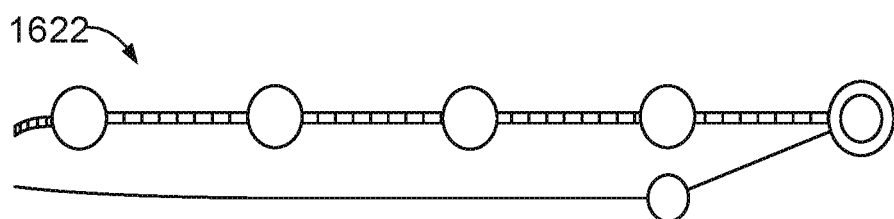
FIG. 16B illustrates a graph of a visualization of routing paths including a link that is indicated to be part of an implicit MPLS tunnel in accordance with some embodiments.
Figure 16B:
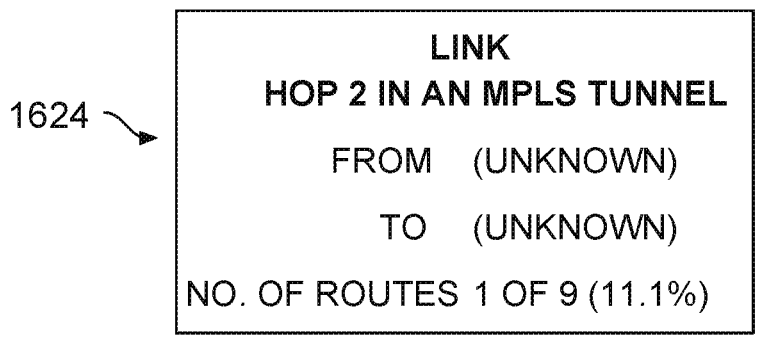

FIG. 16B illustrates a graph of a visualization of routing paths including a link that is indicated to be part of an implicit MPLS tunnel in accordance with some embodiments. For example, when network devices (e.g., such as a router or other network devices) are configured not to send MPLS stack entries, that the link is part of an MPLS tunnel can be inferred, and an attempt to infer the hop number of the tunnel can also be performed using techniques disclosed herein, such as described below. This can be represented as Hop X in an MPLS Tunnel. While no label information may be available (e.g., due to provider router configuration), having the source IPs of the transit network may allow a service provider to cross-reference the externally-visible map against internal documentation to determine the true path taken. In particular, implicit tunnels can be inferred by examining a returned IP TTL in ICMP Time Exceeded packets. If the TTL is 2, then the packet is determined to have expired, as a result of MPLS TTL expiration, and that the link is the second hop in an MPLS tunnel can be inferred. Referring to FIG. 16B, a link 1622 is determined to be part of an implicit MPLS tunnel, and link information is shown at 1624.

Opaque MPLS Tunnel

Figure 16C:
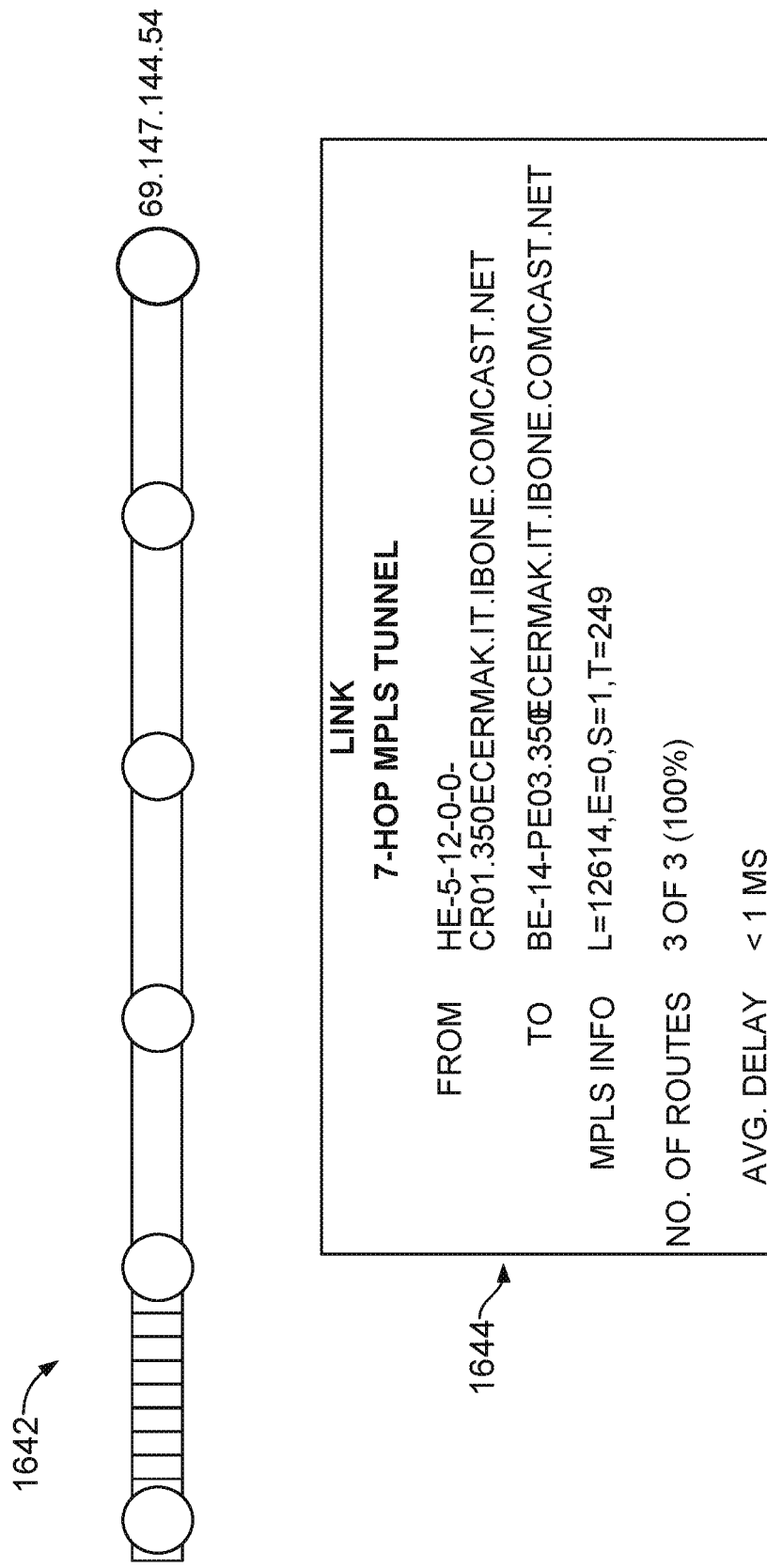
FIG. 16C illustrates a graph of a visualization of routing paths including a link that is indicated to be part of an opaque MPLS tunnel in accordance with some embodiments.

FIG. 16C illustrates a graph of a visualization of routing paths including a link that is indicated to be part of an opaque MPLS tunnel in accordance with some embodiments. For example, in circumstances where a single MPLS label is encountered but the IP TTL is reset at an ingress router, it is possible to show the single hop as an X-hop MPLS tunnel. This information can be helpful when diagnosing network connectivity issues while transiting a service provider's network, because some hops may be obscured from the path visualization output, inferring a sometimes incorrect one-hop transit across the MPLS network. In an example implementation, a length of such an MPLS tunnel can be inferred by looking at the quoted TTL (q-TTL) in the MPLS stack (e.g., if q-TTL=253, then the tunnel has 255−253+1=3 hops). Referring to FIG. 16C, a link 1642 is determined to be part of an opaque MPLS tunnel, and link information is shown at 1644.

Invisible Tunnel

As another example, in circumstances where no MPLS label is shown, and the TTL is not reset, then the presence of an MPLS tunnel may not be detected, and an erroneous link can be inferred.

Annotating Topology with interface MTU

Figure 17:
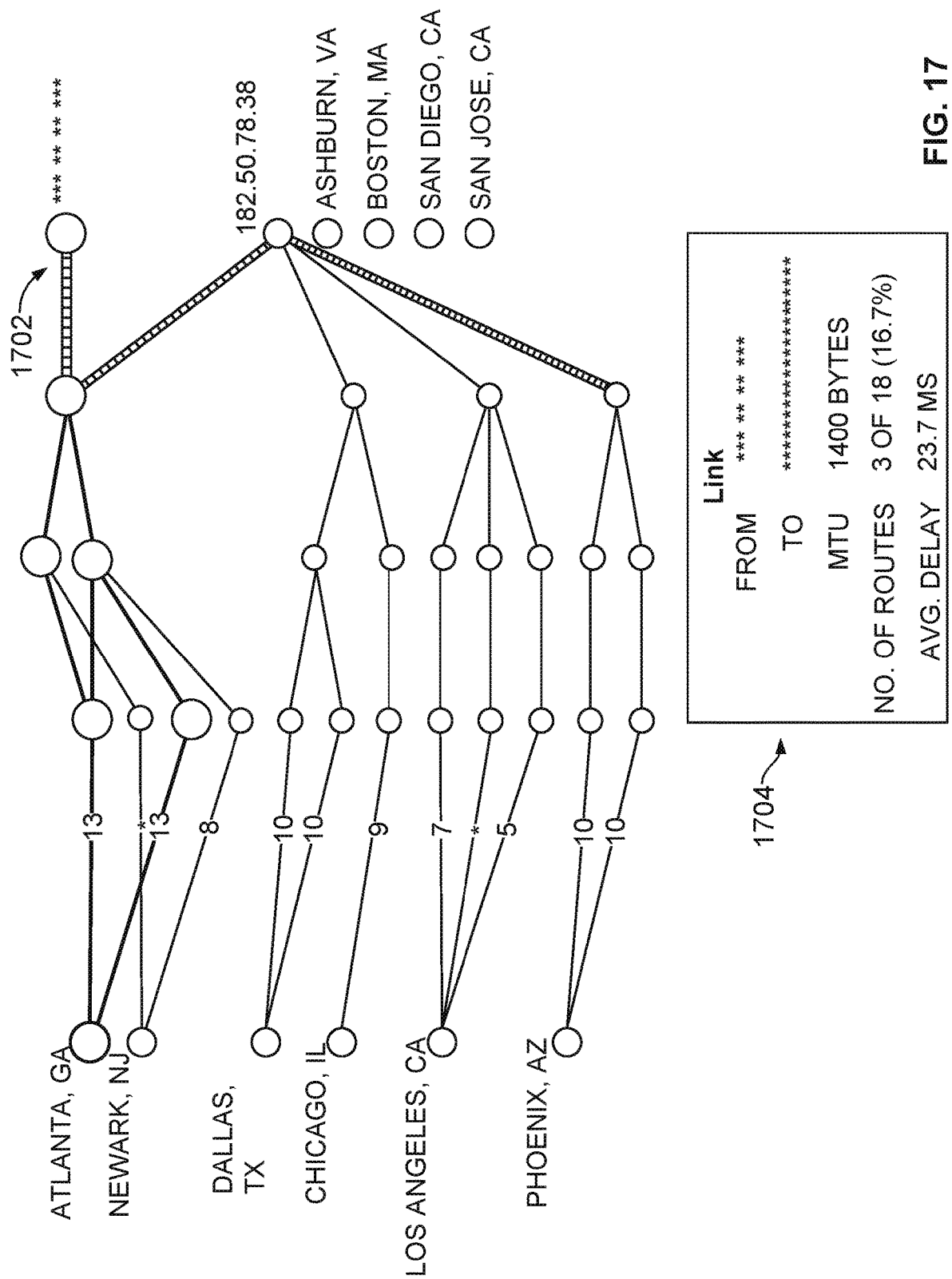
FIG. 17 illustrates a graph of a visualization of routing paths annotated using interface Maximum Transmission Unit (MTU) techniques in accordance with some embodiments.

FIG. 17 illustrates a graph of a visualization of routing paths annotated using interface Maximum Transmission Unit (MTU) techniques in accordance with some embodiments. In an example implementation, a Path MTU Discovery (PMTU) can be executed from each agent, which can be performed to infer the links that show a decrease in the MTU. For example, this can be useful to identify entry points to tunnels (e.g., VPN tunnels or IPv6 in IPv4 tunnels). Referring to FIG. 17, a value of the MTU of link 1702 is provided in link label 1704. In particular, FIG. 17 represents an example of a network where the last hops are VPLS tunnels, and the highlighted link represents the encapsulation point with an MTU of 1400 bytes. In some implementations, the agent can also annotate the link with the final result of PMTU Discovery, and, for example, alert the user if this value is <1280 for IPv6 or <576 for IPv4 (e.g., or some other values), or if the PMTU process failed. These values are selected in this example as these are the minimum requirements imposed by applicable IETF standards. For example, in IPv6, the end-hosts are responsible for fragmenting the packets, unlike IPv4 where middle devices can perform fragmentation. Therefore, in IPV6, end-hosts generally need to be able to run PMTU successfully to determine the maximum packet size they can send. For example, this can be especially critical for various applications, such as DNSSEC over IPv6 where payloads higher than 1280 bytes may be required. As will be apparent to one of ordinary skill in the art, the various techniques described herein can be applied to various different network communication protocols, including, for example, both IPv6 and IPv4, as well as TCP, UDP, and ICMP transport.

Annotating Topology with TCP MSS

Figure 18:
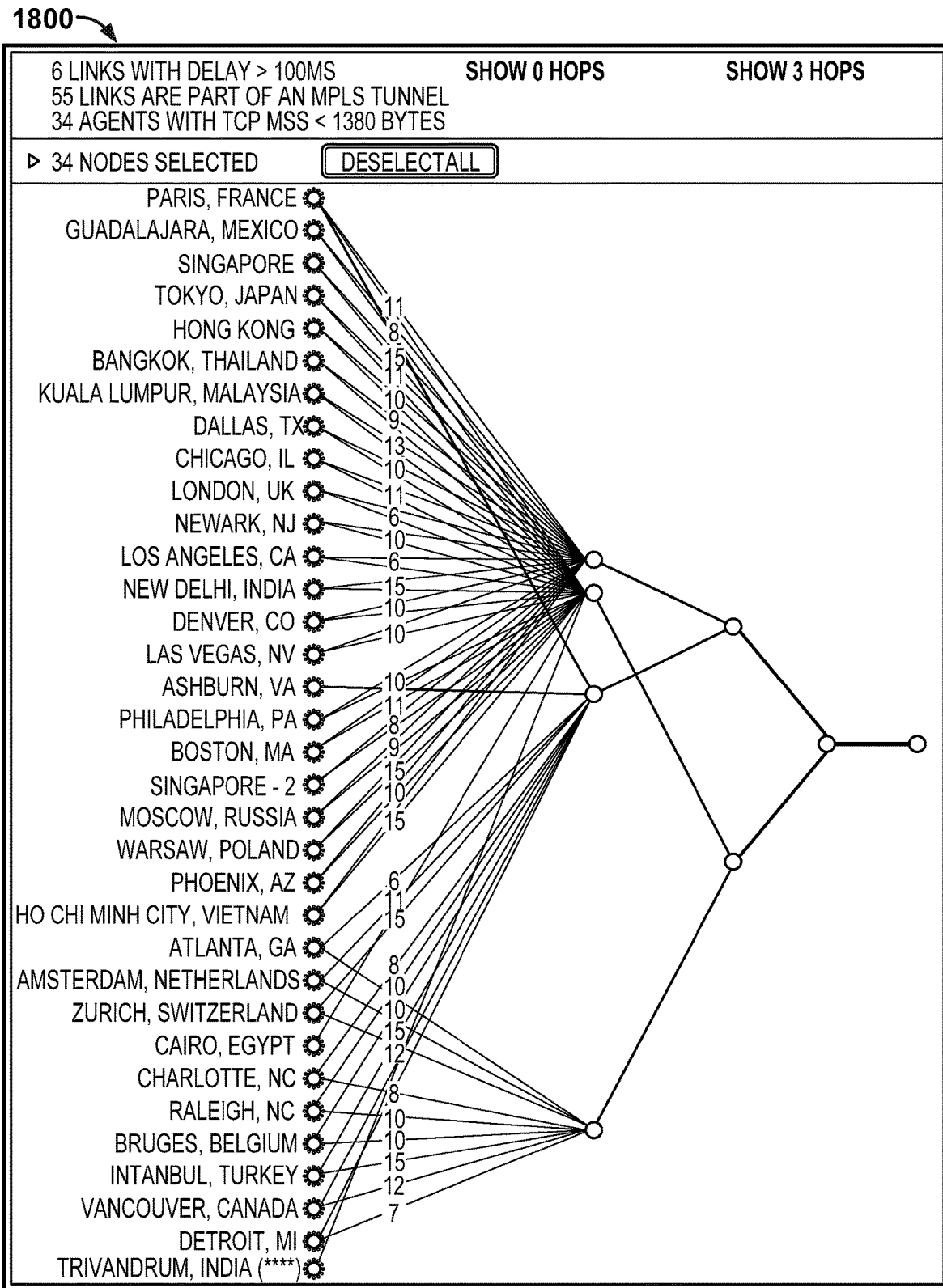
FIG. 18 illustrates a graph of a visualization of routing paths annotated using TCP Maximum Segment Size (MSS) techniques in accordance with some embodiments.

FIG. 18 illustrates a graph of a visualization of routing paths annotated using TCP Maximum Segment Size (MSS) techniques in accordance with some embodiments. As discussed above with respect to FIG. 17, a network topology can be annotated using interface MTU techniques. In some implementations, a network topology can also be annotated using TCP MSS techniques as described below. For example, the TCP MSS for TCP-based network tests can be measured. The MSS value is generally lower than the MTU, which also typically accounts for IP+TCP headers. For example, low values of MSS can result in inefficient TCP connections, because more packets are then used to send the same amount of data. Also, cases where MSS+ Headers>PMTU will originate TCP packet loss and retransmissions until the sender receives the ICMP Packet Too Big message, after which it will reduce its MSS size. As such, these techniques can be implemented to detect and inform users on cases where the MSS value is small, or where the MSS value is too large, which causes IP fragmentation. Referring to FIG. 18, graph 1800 illustrates an example where the value of the MSS is set to a relatively small value (e.g., 1380 bytes), which is affecting all agents reaching the server as shown.

Example processes for monitoring VoIP network services over the Internet using the disclosed techniques will now be described below.

Processes for Monitoring VoIP Network Services Over the Internet

Figure 19:
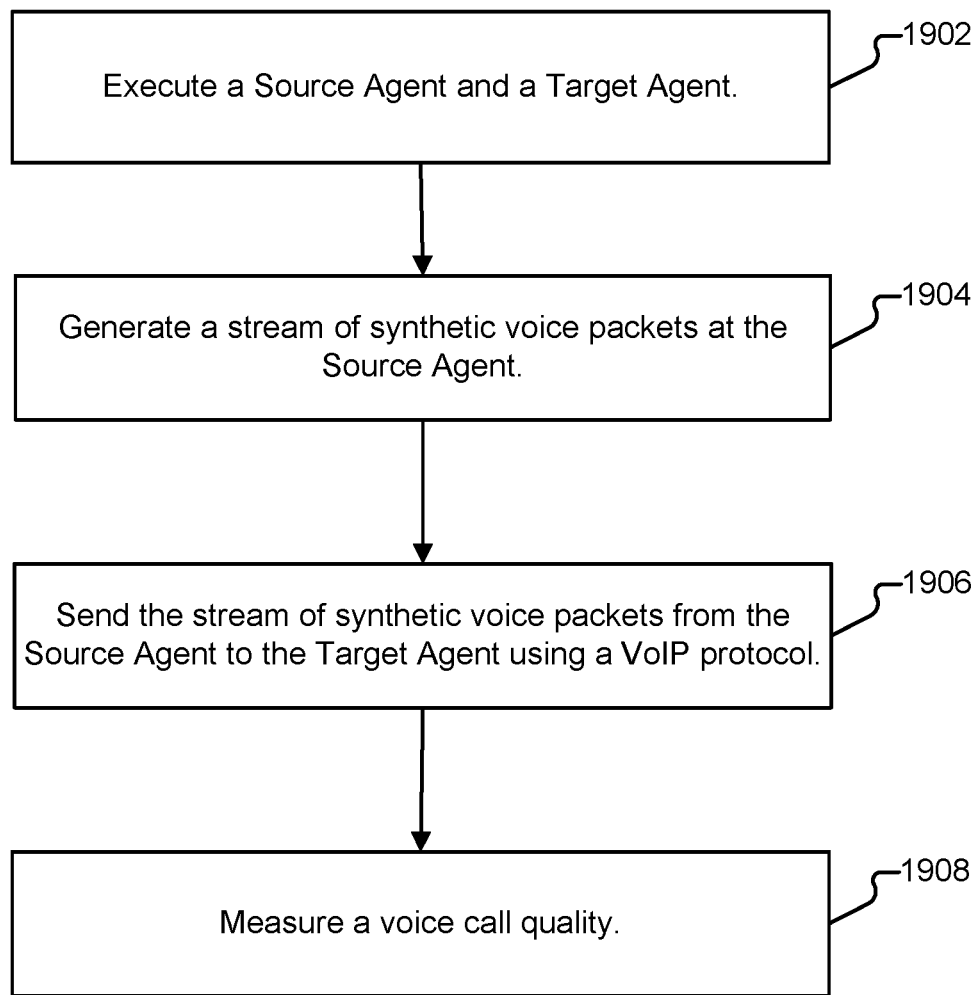
FIG. 19 illustrates a flow diagram for monitoring VoIP network services over the Internet in accordance with some embodiments.

FIG. 19 illustrates a flow diagram for monitoring VoIP network services over the Internet in accordance with some embodiments. In some embodiments, process 1900 is performed using platform 1300 as shown in FIG. 13.

At 1902, a Source Agent and a Target Agent are executed. For example, the Source Agent and the Target Agent can be configured/instrumented for performing voice call quality testing as similarly described above. The Source Agent and the Target Agent can be implemented as enterprise agents that can be deployed and executed on a (virtual) server or another computing device/environment (e.g., in one or more branch offices of an enterprise, such as the Source Agent in a first branch office and the Target Agent in a second branch office for testing between the two branch offices) as similarly described above.

At 1904, generating a stream of synthetic voice packets is performed at the Source Agent. For example, a stream of RTP packets can be generated as similarly described above.

At 1906, the stream of synthetic voice packets is sent from the Source Agent to the Target Agent using a VoIP protocol. For example, the VoIP protocol can be RTP as similarly described above.

At 1908, measuring a voice call quality is performed. For example, the voice call quality can be determined by performing measurements based on the stream of synthetic voice packets sent from the Source Agent to the Target Agent to calculate an MOS value. As another example, an alert can be sent to a network admin if the measured voice call quality is below a threshold value (e.g., a minimum threshold value configured for an MOS value used to measure voice call quality, and/or if other VOIP/network-related problems are detected during the voice call quality testing).

Figure 20:
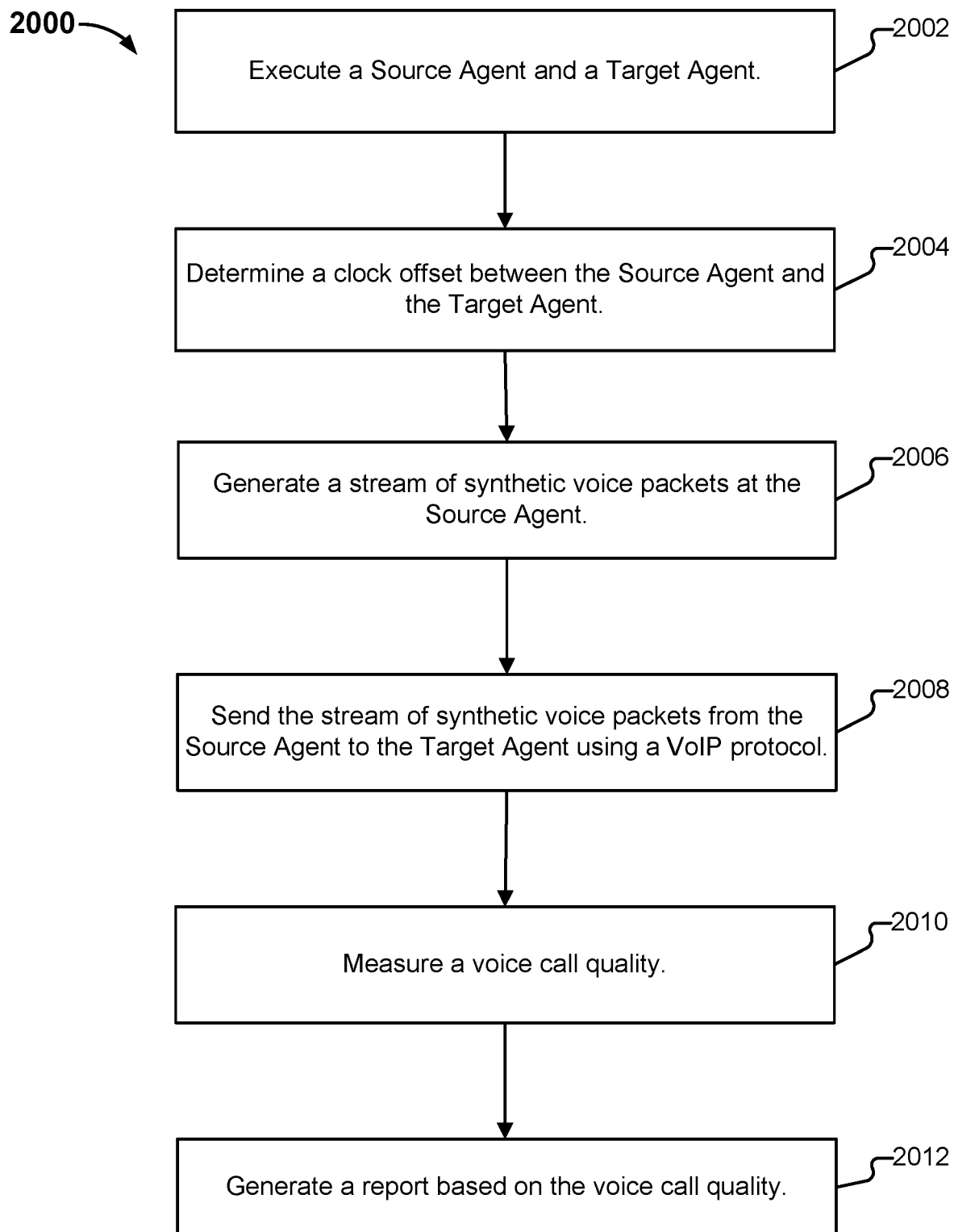
FIG. 20 illustrates another flow diagram for monitoring VoIP network services over the Internet in accordance with some embodiments.

FIG. 20 illustrates a flow diagram for monitoring VoIP network services over the Internet in accordance with some embodiments. In some embodiments, process 2000 is performed using platform 1300 as shown in FIG. 13.

At 2002, a Source Agent and a Target Agent are executed. For example, the Source Agent and the Target Agent can be configured/instrumented for performing voice call quality testing as similarly described above. The Source Agent and the Target Agent can be implemented as enterprise agents that can be deployed and executed on a (virtual) server or another computing device/environment (e.g., in one or more branch offices of an enterprise, such as the Source Agent in a first branch office and the Target Agent in a second branch office for testing between the two branch offices) as similarly described above.

At 2004, determining a clock offset between the Source Agent and the Target Agent is performed. For example, the clock offset can be determined using the disclosed clock offset calculation protocol as described above.

At 2006, generating a stream of synthetic voice packets is performed at the Source Agent. For example, a stream of RTP packets can be generated as similarly described above.

At 2008, the stream of synthetic voice packets is sent from the Source Agent to the Target Agent using a VoIP protocol. For example, the VoIP protocol can be RTP as similarly described above.

At 2010, measuring a voice call quality is performed. For example, the voice call quality can be determined by performing measurements based on the stream of synthetic voice packets sent from the Source Agent to the Target Agent to calculate an MOS value as similarly described above.

At 2012, generating a report based on the voice call quality is performed. For example, the report can include a calculated MOS value determined based on the voice call quality testing and/or various other computed metrics as similarly described above.

Figure 21:
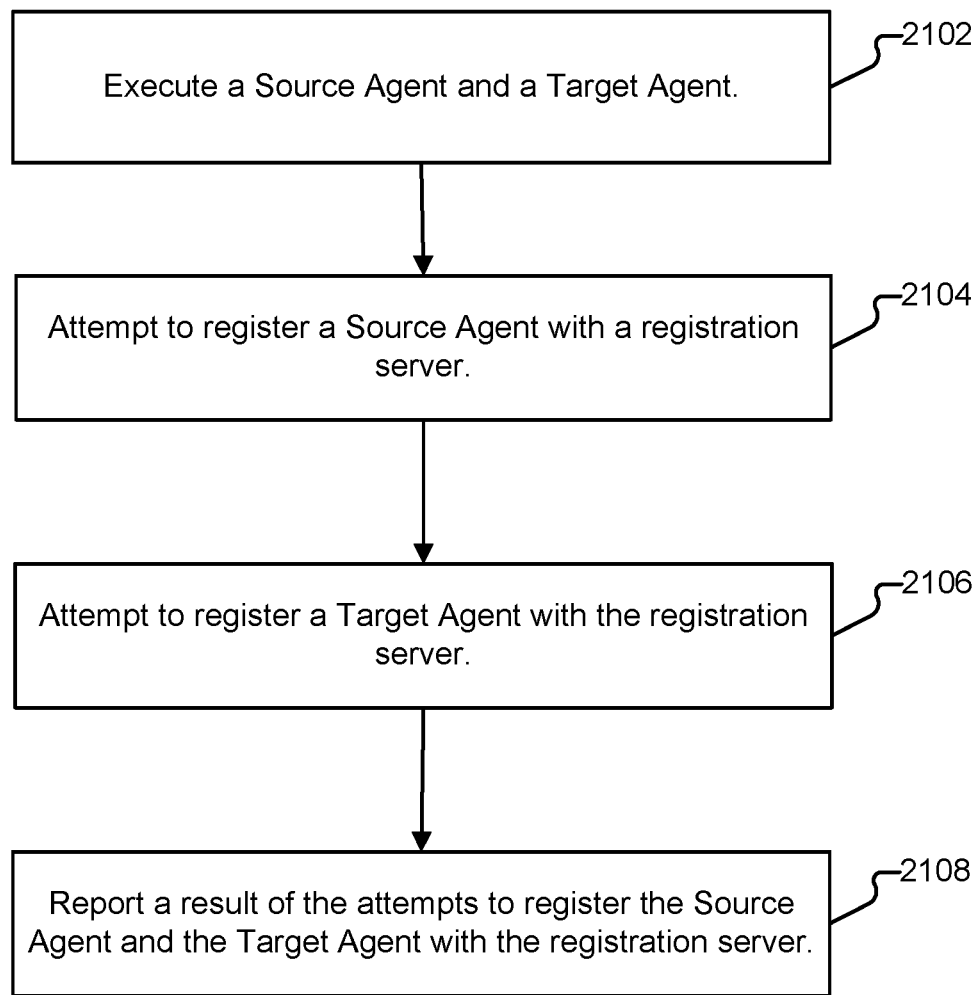
FIG. 21 illustrates another flow diagram for monitoring VoIP network services over the Internet in accordance with some embodiments.

FIG. 21 illustrates a flow diagram for monitoring VoIP network services over the Internet in accordance with some embodiments. In some embodiments, process 2100 is performed using platform 1300 as shown in FIG. 13.

At 2102, a Source Agent and a Target Agent are executed. For example, the Source Agent and the Target Agent can be configured/instrumented for performing SIP Server testing as similarly described above. The Source Agent and the Target Agent can be implemented as enterprise agents that can be deployed and executed on a (virtual) server or another computing device/environment (e.g., in one or more branch offices of an enterprise, such as the Source Agent in a first branch office and the Target Agent in a second branch office for testing between the two branch offices) as similarly described above.

At 2104, a Source Agent attempts to register with a registration server. For example, the Source Agent can attempt to register with a SIP Server (e.g., with username/password credentials) as similarly described above.

At 2106, a Target Agent attempts to register with a registration server. For example, the Target Agent can attempt to register with the SIP Server (e.g., with username/password credentials that are distinct from the username/password credentials submitted by the Source Agent) as similarly described above.

At 2108, a result of the attempts to register the Source Agent and the Target Agent with the registration server is reported. The pass/fail result of the Source Agent's attempt to register with the SIP Server and the Target Agent's attempt to register with the SIP Server can be used to detect VoIP call set-up problems as similarly described above. For example, the report can include results of a sequence of pass/fail phases for each of the stages in the SIP Register, which can include the following: (1) DNS resolution of the SIP Endpoint's hostname; (2) TCP connection to SIP Endpoint if using TCP; (3) received a response to the initial SIP REGISTER message; (4) received a response to the SIP REGISTER message with encrypted challenge; and/or (5) response code to SIP REGISTER message matches the expected response code, as described above.

In one embodiment, the SIP OPTIONS command is used for SIP testing, such as for measuring loss, latency, and jitter between an agent (e.g., Source Agent, acting as a UAC) and the SIP Server endpoint. In one embodiment, loss, latency, and jitter are calculated by sending a series of SIP OPTIONS requests from the agent (e.g., Source Agent, acting as a UAC) to the SIP Server endpoint and capturing the respective responses as further described below. For example, SIP responses can be matched to the requests by checking specific SIP fields, such as Call-ID, CSeq, and To and From tags. In this example test, the test determines if the UAs (e.g., Source/Target Agents) are able to contact the SIP Server (e.g., SIP Registrar or SIP Proxy) and if there are any network impairments affecting the path to that SIP Registrar.

In one embodiment, SIP testing further includes attempting to setup a call session between the Source Agent and the Target Agent. For example, the report can include results of a Voice over IP (VoIP) call initiation test using the Source Agent and the Target Agent.

In one embodiment, in addition to pass/fail status for each of the stages in the SIP Register, the Source Agent is instrumented to compute timing metrics. Example timing metrics can include the following: (1) DNS resolution time to the SIP Endpoint; (2) TCP connection establishment time (e.g., if redirection was performed, then the Source Agent can be configured/instrumented to only measure the time regarding the last SIP Server); (3) latency of response to an initial SIP REGISTER message (e.g., if redirection was performed, then the Source Agent can be configured/instrumented to only measure the time regarding the last SIP Server); and/or (4) latency of response to a SIP REGISTER message with encrypted challenge, as described above.

In one embodiment, the agent (e.g., Source Agent and/or Target Agent) queries the SIP Server for one or more capabilities. As described above, a specific capability or capabilities can be determined to be supported by the SIP Server if its response matches a specific regular expression (regex) configured in the test settings. For example, by monitoring the SIP Server's configured capabilities (e.g., at every frequency interval), the agent can immediately identify and report/alert if and when the server was misconfigured (e.g., an alert can be sent to a VoIP/network administrator, such as via an electronic communication, a dashboard alert, or another type of communication of the alert(s)). As another example, the SIP Server's response can then be matched against a regular expression (regex) to confirm if a particular capability is being advertised or not (e.g., this can be applied to verify capabilities, such as for cloud-based VoIP service providers that provide SIP Server/services in the cloud, such as RingCentral and/or other cloud-based VoIP service providers, and can include using a cloud-based agent(s)).

Figure 22:
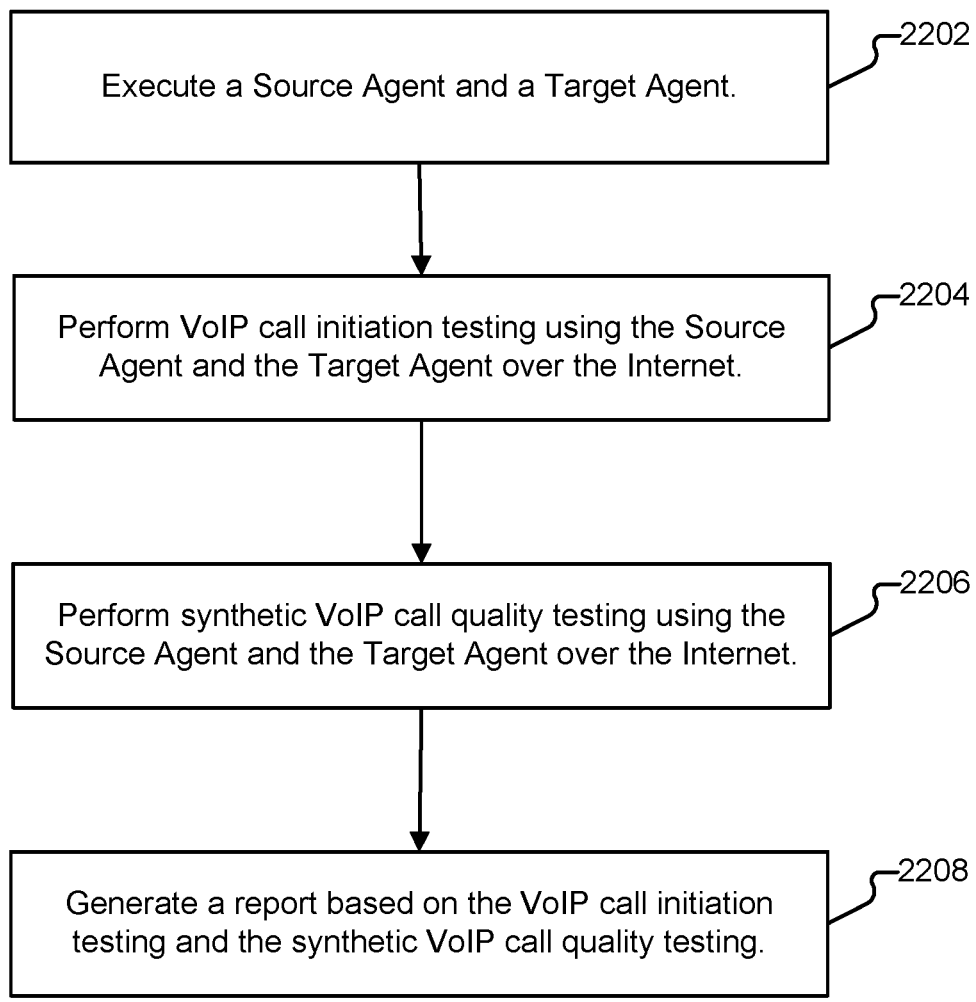
FIG. 22 illustrates another flow diagram for monitoring VoIP network services over the Internet in accordance with some embodiments.

FIG. 22 illustrates a flow diagram for monitoring VoIP network services over the Internet in accordance with some embodiments. In some embodiments, process 2200 is performed using platform 1300 as shown in FIG. 13.

At 2202, a Source Agent and a Target Agent are executed. For example, the Source Agent and the Target Agent can be configured/instrumented for performing SIP Server testing and voice call quality testing as similarly described above. The Source Agent and the Target Agent can be implemented as enterprise agents that can be deployed and executed on a (virtual) server or another computing device/environment (e.g., in one or more branch offices of an enterprise, such as the Source Agent in a first branch office and the Target Agent in a second branch office for testing between the two branch offices) as similarly described above.

At 2204, VoIP call initiation testing is performed using the Source Agent and the Target Agent over the Internet. For example, the SIP testing techniques can be performed (e.g., periodically) using the Source Agent and the Target Agent as described above.

At 2206, synthetic VoIP call quality testing is performed using the Source Agent and the Target Agent over the Internet. For example, the RTP testing techniques (e.g., using a stream of Real-time Transfer Protocol (RTP) packets and/or a stream of custom Real-time Transfer Protocol (RTP) packets) can be performed (e.g., periodically) using the Source Agent and the Target Agent as described above.

At 2208, a report is generated based on the VoIP call initiation testing and the synthetic VoIP call quality testing. For example, various reports/alerts can be generated based on the call initiation testing and the synthetic voice call quality testing (e.g., reporting that the SIP Server configuration has an incorrect/slower network interface for B, reporting network path changes when going through the SIP Server such that different network delays/drop problems can arise, and/or other configuration-related and/or networking problems) as described above.

In one embodiment, in addition to active probing to perform the VoIP call initiation testing and synthetic VoIP call quality testing, the disclosed techniques include determining a network path (e.g., performing network path tracing and BGP monitoring as described above) and other network performance measures end-to-end from the Source Agent and the Target Agent. For example, network path tracing and BGP monitoring can be performed for monitoring and/or troubleshooting VoIP network services over the Internet (e.g., DSCP enhancements can be utilized for path tracing to detect if an intermediate network hop is modifying the DSCP configured value, such as downgrading the quality of the routing for the packets). The report and/or dashboard can include end-to-end network path views to facilitate troubleshooting VoIP network services over the Internet as described above.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   initiating, by a device in communication with a Voice over IP (VoIP) server that monitors VoIP setup and quality over the Internet among devices, VoIP initiation testing between a source agent and a target agent, wherein the VoIP initiation testing is performed without instrumentation of the VoIP server;
   receiving, by the device, VoIP initiation test results for the VoIP initiation testing;
   determining, by the device, a network path between the source agent and the target agent using network path tracing; and
   generating, by the device, a report based on the VoIP initiation test results that includes information related to the determined network path.

2. The method as in claim 1, wherein the VoIP server monitors call quality and video quality.

3. The method as in a claim 1, wherein the VoIP initiation testing is performed using active probing and includes one or more of: a registration test or a session setup test.

4. The method as in claim 1, further comprising:
   initiating, by the device, synthetic VoIP quality testing between the source agent and the target agent, wherein the VoIP synthetic quality testing is performed without instrumentation of the VoIP server that monitors VoIP setup and quality over the Internet; and
   receiving, by the device, synthetic VoIP quality test results for the synthetic VoIP quality testing, wherein there the report is further based on the synthetic VoIP quality test results.

5. The method as in claim 4, wherein the synthetic VoIP quality testing is performed using a stream of Real-time Transfer Protocol (RTP) packets.

6. The method as in a claim 4, wherein the synthetic VoIP quality testing is performed using a stream of custom Real-time Transfer Protocol (RTP) packets.

7. The method as in a claim 1, wherein determining, by the device, the network path between the source agent and the target agent is based upon one or more of: a) MultiProtocol Label Switching (MPLS) tunnel inference and route labeling or b) path Maximum Transmission Unit (MTU) and MTU decrements.

8. The method as in a claim 1, wherein the report based on the VoIP initiation test results further includes an indication of call quality or video quality between the source agent and the target agent.

9. An apparatus, comprising:
   one or more network interfaces to communicate with a Voice over IP (VoIP) server that monitors VoIP setup and quality over the Internet among devices;
   a processor coupled to the network interfaces and configured to execute one or more processes; and
   an apparatus memory configured to store a process executable by the processor, the process when executed operable to:
   initiate VoIP initiation testing between a source agent and a target agent, wherein the VoIP initiation testing is performed without instrumentation of the VoIP server;
   receive VoIP initiation test results for the VoIP initiation testing;
   determine a network path between the source agent and the target agent using network path tracing; and
   generate a report based on the VoIP initiation test results that includes information related to the determined network path.

10. The apparatus as in claim 9, wherein the VoIP server monitors call quality and video quality.

11. The apparatus as in claim 9, wherein the VoIP initiation testing is performed using active probing and includes one or more of: a registration test or a session setup test.

12. The apparatus as in claim 9, the process when executed further operable to:
   initiate synthetic VoIP quality testing between the source agent and the target agent, wherein the VoIP synthetic quality testing is performed without instrumentation of the VoIP server that monitors VoIP setup and quality over the Internet; and
   receive synthetic VoIP quality test results for the synthetic VoIP quality testing, wherein there the report is further based on the synthetic VoIP quality test results.

13. The apparatus as in claim 12, wherein the synthetic VoIP quality testing is performed using a stream of Real-time Transfer Protocol (RTP) packets.

14. The apparatus as in claim 12, wherein the synthetic VoIP quality testing is performed using a stream of custom Real-time Transfer Protocol (RTP) packets.

15. The apparatus as in claim 9, wherein to determine the network path between the source agent and the target agent is based upon one or more of: a) MultiProtocol Label Switching (MPLS) tunnel inference and route labeling or b) path Maximum Transmission Unit (MTU) and MTU decrements.

16. The apparatus as in claim 9, wherein the report based on the VoIP initiation test results further includes an indication of call quality or video quality between the source agent and the target agent.

17. A tangible, non-transitory, computer-readable medium storing program instructions that cause a device, in communication with a Voice over IP (VoIP) server that monitors VoIP setup and quality over the Internet among devices, to execute a process comprising:
   receiving, by a device, VoIP initiation testing between a source agent and a target agent, wherein the VoIP initiation testing is performed without instrumentation of the VoIP server;
   receiving VoIP initiation test results for the VoIP initiation testing;
   determining a network path between the source agent and the target agent using network path tracing; and
   generating a report based on the VoIP initiation test results that includes information related to the determined network path.

18. The tangible, non-transitory, computer-readable medium as in claim 17, wherein the VoIP initiation testing is performed using active probing and includes one or more of: a registration test or a session setup test.

19. The tangible, non-transitory, computer-readable medium as in claim 17, the process further comprising:
   initiating synthetic VoIP quality testing between the source agent and the target agent, wherein the VoIP synthetic quality testing is performed without instrumentation of the VoIP server that monitors VoIP setup and quality over the Internet; and
   receiving synthetic VoIP quality test results for the synthetic VoIP quality testing, wherein there the report is further based on the synthetic VoIP quality test results.

20. The tangible, non-transitory, computer-readable medium as in claim 19, wherein the synthetic VoIP quality testing is performed using a stream of one or more of: Real-time Transfer Protocol (RTP) packets or custom RTP packets.

\* \* \* \* \*